United States Patent [19]
Hosoda

[11] Patent Number: 6,007,094
[45] Date of Patent: Dec. 28, 1999

[54] AIRBAG SYSTEM FOR VEHICLE

[75] Inventor: Koji Hosoda, Hiroshima-ken, Japan

[73] Assignee: Mazda Motor Corporation, Hiroshima, Japan

[21] Appl. No.: 09/003,819

[22] Filed: Jan. 7, 1998

[30] Foreign Application Priority Data

Jan. 9, 1997 [JP] Japan .................................. 9-002130

[51] Int. Cl.⁶ .............................................. B60R 21/32
[52] U.S. Cl. .............................................. 280/735
[58] Field of Search ......................... 280/735, 728.1, 280/730.1

[56] References Cited

U.S. PATENT DOCUMENTS

| | | | |
|---|---|---|---|
| 5,172,790 | 12/1992 | Ishikawa et al. . | |
| 5,454,591 | 10/1995 | Mazur et al. | 200/735 |
| 5,468,014 | 11/1995 | Gimbel et al. | 280/735 |
| 5,515,933 | 5/1996 | Meyer et al. | 280/735 |
| 5,528,698 | 6/1996 | Kamei et al. | 280/735 |
| 5,570,903 | 11/1996 | Meister et al. | 280/735 |
| 5,605,348 | 2/1997 | Blackburn et al. | 280/735 |
| 5,618,056 | 4/1997 | Schoos et al. | 280/735 |
| 5,683,103 | 11/1997 | Blackburn et al. | 280/735 |
| 5,690,356 | 11/1997 | Lane, Jr. . | |
| 5,882,035 | 3/1999 | Munro . | |

FOREIGN PATENT DOCUMENTS 7-196006  8/1995  Japan .

Primary Examiner—Kenneth R. Rice

[57] ABSTRACT

In an airbag system for a vehicle, a seat sensor unit determines the attached state of a child seat on the basis of the radio communication state made between a transponder equipped in the child seat and antennas in a front passenger seat, and the output state of a passenger detection sensor in the front passenger seat, and transmits the determined state to a control unit. The control unit controls the necessity of deployment of a passenger-side airbag on the basis of the incoming communication result.

17 Claims, 22 Drawing Sheets

(WHEN CHILD SEAT FACES FRONT)

(WHEN CHILD SEAT FACES REAR)

FIG. 10

(○: DEPLOYMENT PERMISSION, ×: DEPLOYMENT INHIBITION)

| PASSENGER DETECTION / C·S DETECTION | PASSENGER DETECTION | | | PASSENGER NON-DETECTION | | | PASSENGER DETECTION SENSOR FATAL FAILURE | | |
|---|---|---|---|---|---|---|---|---|---|
| | A·B CONTROL | STATUS INDICATION | WARNING INDICATION | A·B CONTROL | STATUS INDICATION | WARNING INDICATION | A·B CONTROL | STATUS INDICATION | WARNING INDICATION |
| C·S POSITION OFFSET | × | ON (FLICKERING) | OFF | × | ON | OFF | × | ON | ON |
| INPUT SIGNAL ABNORMALITY | ○ | OFF | OFF | × | ON | OFF | ○ | OFF | ON |
| HARDWARE ERROR | ○ | OFF | ON | × | ON | ON | ○ | OFF | ON |
| FRONT-FACING C·S DETECTION | ○ | OFF | OFF | ○ | OFF | OFF | ○ | OFF | ON |
| REAR-FACING C·S DETECTION | × | ON | OFF | × | ON | OFF | × | ON | ON |
| C·S ABSENCE | ○ | OFF | OFF | × | ON | OFF | ○ | OFF | ON |

FIG. 11

| FLAG | CONTENTS | DEFINITION WHEN FLAG IS SET |
|---|---|---|
| SPPD | SENSOR STATUS FLAG : PASSENGER DETECTION | PASSENGER DETECTION SENSOR DETECTS PRESENCE OF PASSENGER |
| XPPD | STATUS DETERMINATION FLAG : PASSENGER DETECTION | STATE "PRESENCE OF PASSENGER" IS DETERMINED |

FIG. 12

| COUNTER | CONTENTS |
|---|---|
| CSPPD | STATUS DETERMINATION FLAG : PASSENGER DETECTION SET COUNTER |
| CRPPD | STATUS DETERMINATION FLAG : PASSENGER DETECTION RESET COUNTER |

FIG. 13

| TIMER | CONTENTS | DATA |
|---|---|---|
| TSPPD1 | STATUS DETERMINATION SET TIMER 1 : PASSENGER DETECTION | 4sec |
| TSPPD2 | STATUS DETERMINATION SET TIMER 2 : PASSENGER DETECTION | 8sec |
| TRPPD1 | STATUS DETERMINATION RESET TIMER 1 : PASSENGER DETECTION | 4sec |
| TRPPD2 | STATUS DETERMINATION RESET TIMER 2 : PASSENGER DETECTION | 8sec |

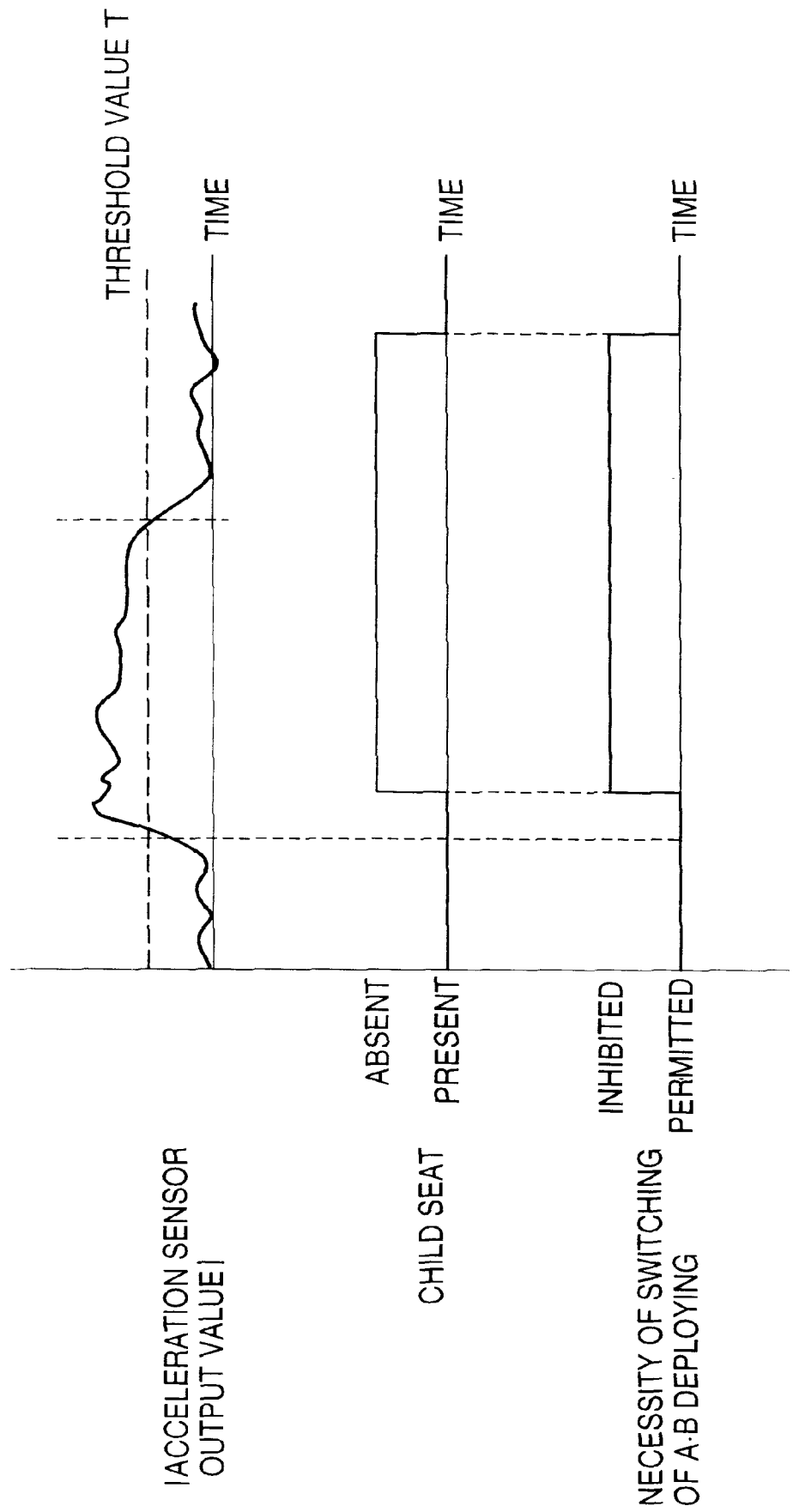

6,007,094

AIRBAG SYSTEM FOR VEHICLE

BACKGROUND OF THE INVENTION

The present invention relates to an airbag system for a vehicle and, more particularly, to an airbag system for an automobile as a typical vehicle.

In recent years, automobiles as a typical vehicle have been increasingly popularly equipped both driver- and passenger-side airbag systems. Such airbag systems need properly deploy in car crashes, but must not needlessly deploy in absence of such emergencies in terms of labor and cost since exchange and adjustment are required once they have deployed. In the control of such airbag systems, it is important in, especially, the deployment control of the passenger-side airbag to check whether or not a passenger is sitting in the front passenger seat unlike the driver-side airbag, since often no passenger sits in the front passenger seat. In a vehicle equipped a passenger-side airbag, another problem is posed in its deployment control when a so-called child seat for an infant is attached to the front passenger seat. When a child seat is attached facing front to the front passenger seat, the passenger-side airbag must be permitted to deploy, but when a child seat is attached facing rear, the passenger-side airbag must be inhibited from deploying since shocks to the child seat and an infant who is sitting in that child seat upon deployment of the passenger-side airbag must be prevented.

As a method of solving such problem, for example, Japanese Laid-Open Patent No. 7-196006 discloses a technique for detecting the presence/absence of a child seat by arranging an optical distance sensor or the like in the vicinity of an airbag storage portion. On the other hand, Japanese Laid-Open Patent No. 8-58522 discloses a technique for controlling the necessity of deploying an airbag using both a distance sensor and a weight sensor equipped in a seat. Also, Japanese Laid-Open Patent Nos. 7-165011 and 7-267044 disclose a technique for detecting the presence/absence of a child seat via communications with the child seat using a transmission/reception mechanism arranged in a seat.

However, in these prior arts, when the distance sensor is used, determination precision has poor reliability. On the other hand, in the prior art that makes communications between the seat and child seat, no concrete disclosure is given as to control upon determining the necessity of deploying an airbag when the child seat is attached facing front or its position cannot be accurately determined.

SUMMARY OF THE INVENTION

It is, therefore, an object of the present invention to provide an airbag system for a vehicle which can properly control the necessity of deploying an airbag depending on the attached state of a child seat.

In order to achieve the above object, an airbag system according to the present invention is characterized by the following arrangement.

That is, an airbag system for a vehicle comprises determining means for making a predetermined communication between a seat of a vehicle and a child seat placed on the seat, and determining a direction of the child seat, and control means for, when an output from the determining means indicates the child seat facing the front direction of the vehicle, permitting an airbag, associated with the child seat placement, to deploy, and for, when the output from the determining means indicates the child seat facing the rear direction of the vehicle, inhibiting the airbag from deploying, and when the control means detects that the predetermined communication is made by the determining means, and the determining means cannot determine the direction of the child seat, the control means inhibits the airbag from deploying.

With this arrangement, when the attachment of the child seat can be confirmed by the communication means but its direction cannot be determined, the airbag is inhibited from deploying using, as the top priority decision factor, the fact that the child seat is attached. The case wherein the direction cannot be determined preferably does not include a case wherein the direction of the child seat is the front or rear direction of a vehicle, but includes a case wherein the attached position is offset from a predetermined position.

Preferably, the determining means receives an output from a sensor used for determining the direction of the child seat, and a case in which the determining means cannot determine the direction of the child seat includes a case in which the sensor is defective.

With this arrangement, when the determining means cannot make an accurate decision due to the defective sensor, deployment of the airbag is inhibited based on fail safe using, as the top priority decision factor, the fact that the child seat may be attached.

The system further comprises warning means for, when the control means inhibits the airbag from deploying, generating a warning indicating the inhibition. When the attached position of the child seat is offset from the predetermined position, the warning message is preferably generated.

This message can inform the passenger of the current control state of the airbag, and can be used to help the passenger correct the position of the child seat if the child seat is placed at an offset position.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a table for explaining necessity decision of airbag deployment in the airbag system according to the first embodiment of the present invention;

FIG. 11 is a table showing the internal parameters used in status determination according to an embodiment of the present invention (upon determining passenger detection);

FIG. 12 is a table showing the internal parameters used in status determination according to the embodiment of the present invention (upon determining passenger detection);

FIG. 13 is a table showing the internal parameters used in status determination according to the embodiment of the present invention (upon determining passenger detection);

FIG. 20 is a flow chart showing permission/inhibition of airbag deployment switching control according to the third embodiment of the present invention;

DETAILED DESCRIPTION OF THE PREFERRED EMBODIMENTS

The preferred embodiments in which an airbag system according to the present invention is applied to an automobile as a typical vehicle will be explained hereinafter with reference to the accompanying drawings.

[First Embodiment]

The outline of an airbag system of this embodiment will first be described with reference to FIGS. 1 and 2.

Figure 2:
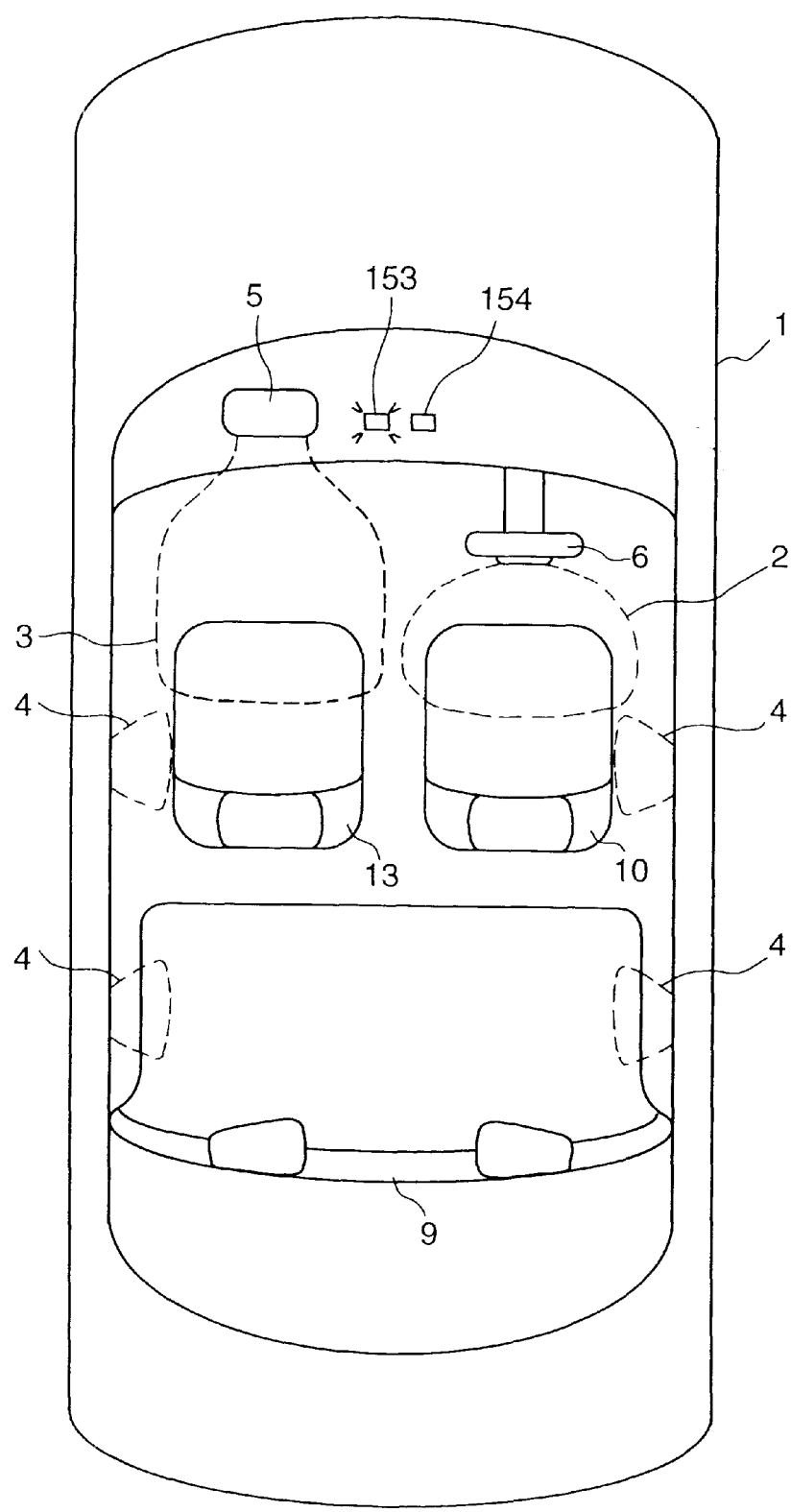
FIG. 2 is a schematic view of an automobile with the airbag system according to the first embodiment of the present invention.

FIG. 2 is a schematic view of an automobile with the airbag system according to the first embodiment of the present invention.

In FIG. 2, an automobile 1 is equipped a driver-side airbag 2 (in the inflated state) for a passenger at a driver seat 10 inside a steering wheel 6, and a passenger-side airbag 3 (in the deployed state) for a passenger at a front passenger seat 13 inside a passenger-side airbag storage portion 5. The body of the automobile 1 comprises a plurality of shock detection sensors (not shown) for detecting external shocks. Reference numeral 153 denotes a status indication lamp that indicates the current control state of the passenger-side airbag. For example, the lamp 153 is ON when the passenger-side airbag 3 is inhibited from deploying; it is OFF when it is permitted to deploy. Reference numeral 154 denotes a status selection switch operated when the passenger himself or herself switches necessity (permission/inhibition) of deployment of the passenger-side airbag 3. Also, side airbags 4 (in the inflated state) that relax sideward shocks may be equipped at the vehicle body sides of the driver seat 10 and front passenger seat 13, and at both sides of a back seat 9.

Figure 1:
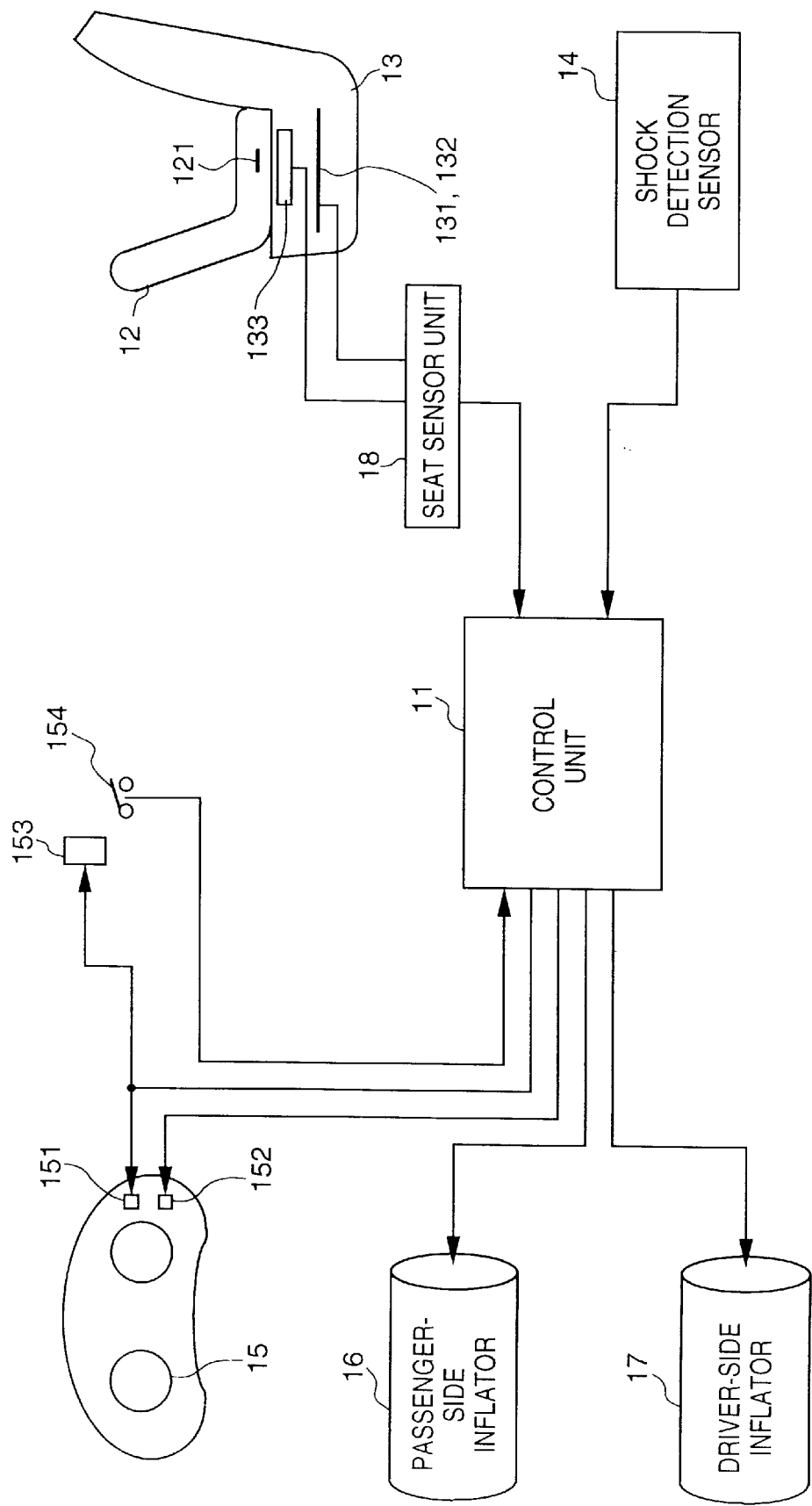
FIG. 1 is a schematic diagram showing the arrangement of an airbag system according to the first embodiment of the present invention.

FIG. 1 is a schematic diagram showing the arrangement of the airbag system according to the first embodiment of the present invention.

In FIG. 1, a control unit 11 of the airbag system of this embodiment is connected with a plurality of shock detection sensors 14 which are arranged on the body of the automobile 1 and detect external shocks, a seat sensor unit 18 for communicating the attached state of the child seat 12 (to be described in detail later), a passenger-side inflator 16 for deploying the passenger-side airbag 3, a driver-side inflator 17 for deploying the driver-side airbag 2, a status indication lamp 151 which indicates the current control state of the passenger-side airbag 3 and is arranged in an instrument panel 15 in front of the driver seat 10, a failure warning lamp 152 which indicates the failure state of the passenger-side airbag 3 and arranged in the instrument panel 15 in front of the driver seat 10, the above-mentioned status indication lamp 153 and status selection switch 154, and the like. When the side airbags 4 are equipped, inflators for deploying the side airbags are connected to the control unit 11, needless to say.

As will be described in detail later, FIG. 1 illustrates the state wherein the child seat 12 is attached to the front passenger seat 13. The seat sensor unit 18 is connected with a passenger detection sensor 133 which is embedded in the front passenger seat 13 and detects the presence/absence of a passenger by means of weight, and reception and transmission antennas 131 and 132 embedded in the front passenger seat 13. The seat sensor unit 18 makes radio communications with a transponder 121 equipped in the child seat 12, and converts a signal received by the reception antenna 131 on the basis of a predetermined format and transmits the converted signal to the control unit 11.

In this embodiment, the control of necessity of deploying the passenger-side airbag 3 by the control unit 11 will be explained. However, in practice, deployment control of the side airbags 4 is also done.

<Device Arrangements of Control Unit and Seat Sensor Unit>

The device arrangements of the control unit 11 and seat sensor unit 18 will be described below with reference to FIGS. 3 and 4.

Figure 3:
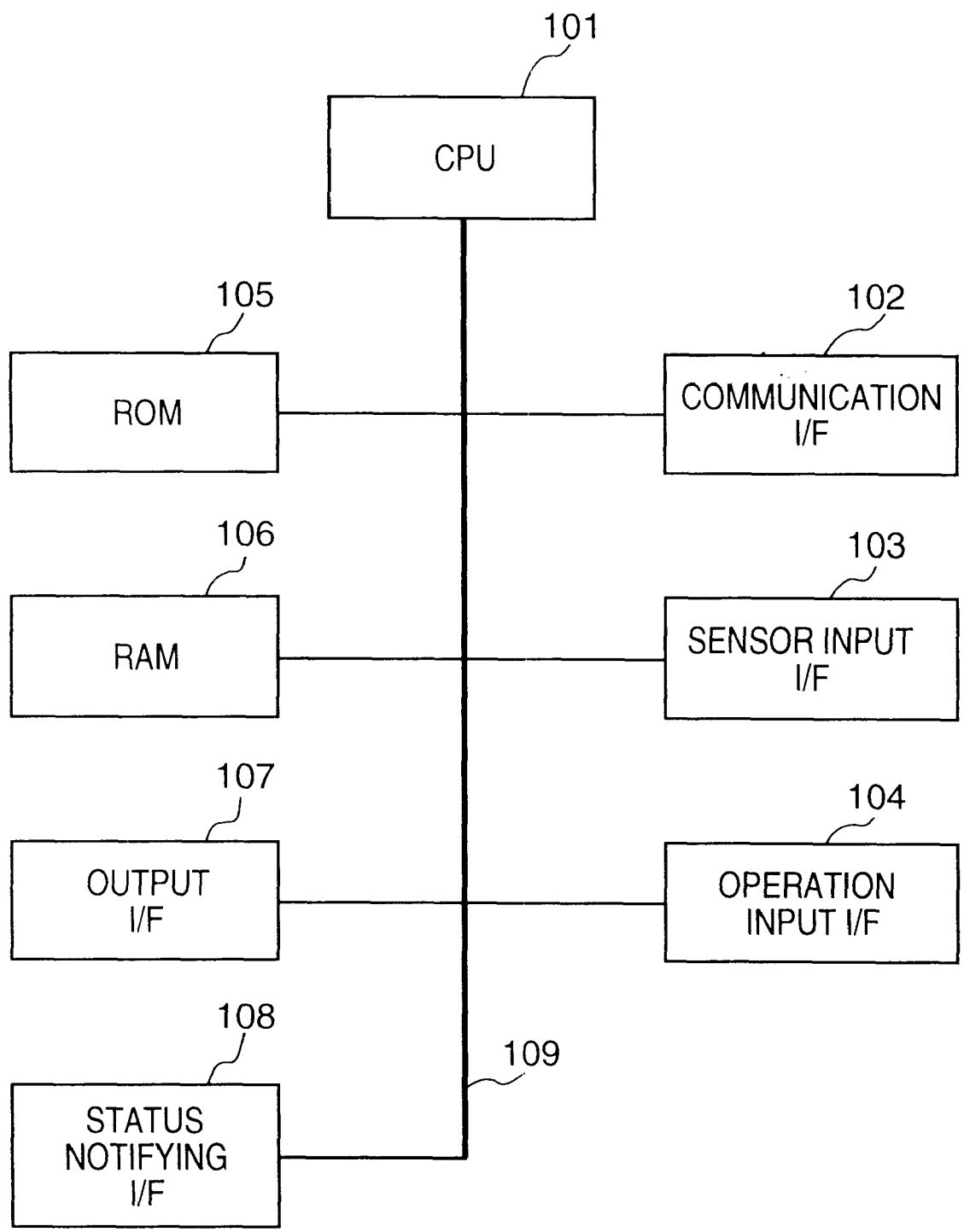
FIG. 3 is a schematic block diagram showing the arrangement of a control unit 11 according to the first embodiment of the present invention.

FIG. 3 is a schematic block diagram showing the arrangement of the control unit 11 according to the first embodiment of the present invention.

In FIG. 3, a communication interface (I/F) 102 is connected to the seat sensor unit 18 and makes predetermined serial communications (to be described in detail later). A sensor input interface (I/F) 103 receives the input signals from the shock detection sensors 14. An operation input interface (I/F) 104 receives the selection signal from the selection switch 154. The output interface (I/F) 107 outputs a deploying signal to the passenger- and driver-side inflators 16 and 17. A status notifying interface (I/F) 108 turns on/off the status indication lamps 151 and 153 and the failure warning lamp 152 (also used for turning on/off a warning buzzer in the second embodiment to be described later). A ROM (read only memory) 105 pre-stores a deployment control program of the passenger-side airbag, a communication program with the seat sensor unit 18, various permanent parameters, and the like, as will be described later in this embodiment. A RAM (random access memory) 106 is used as a work area upon executing the control program, and temporarily stores variable parameters and the like. These arrangements are connected to each other via a bus 109, and are controlled by a CPU 101 which operates in accordance with the control program stored in the ROM 105.

Figure 4:
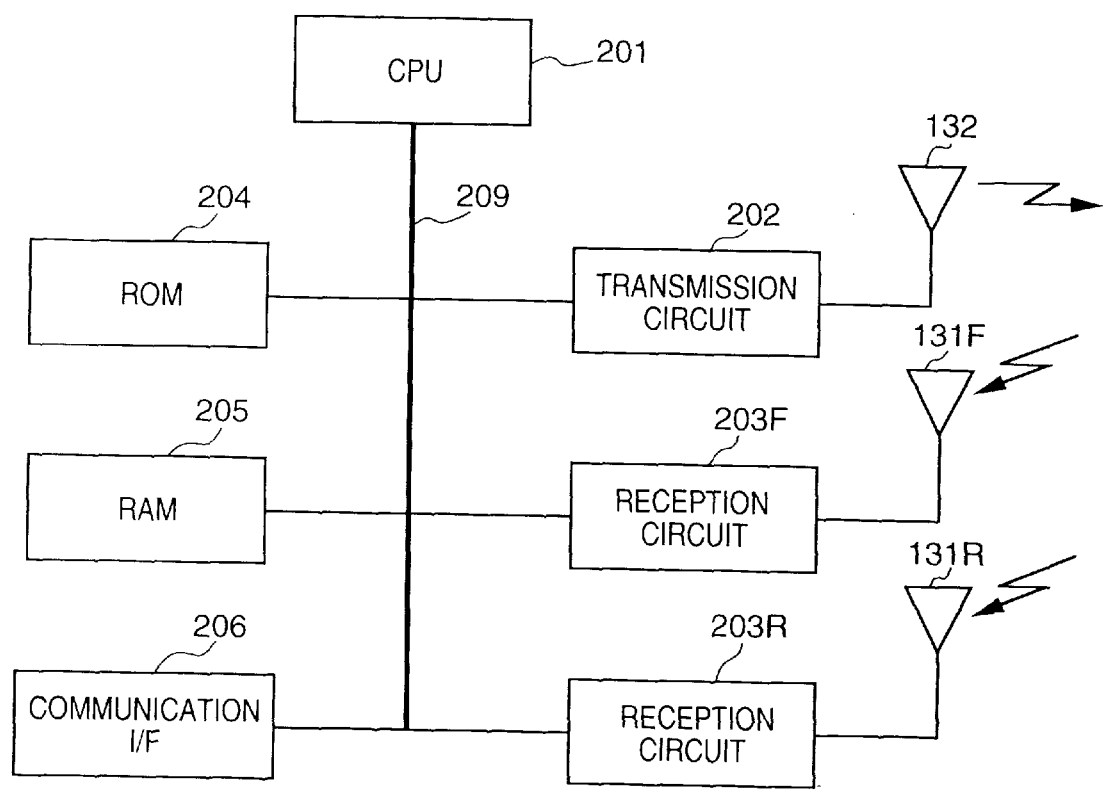
FIG. 4 is a schematic block diagram showing the arrangement of a seat sensor unit 18 according to the first embodiment of the present invention.

FIG. 4 is a schematic block diagram showing the arrangement of the seat sensor unit 18 according to the first embodiment of the present invention.

In FIG. 4, a transmission circuit 202 sends a predetermined frequency Fa from the transmission antenna 132. Reception circuits 203F and 203R receive external radio waves using reception antennas 131F and 131R. A communication interface (I/F) 206 is connected to the control unit 11 and makes predetermined serial communications (to be described in detail later). A ROM (read only memory) 204 pre-stores a communication program for converting signals received by the reception circuits 203F and 203R and the input signal from the passenger detection sensor 133 into those of a predetermined format, and transmitting the converted signals to the control unit 11, various permanent parameters, and the like. Assume that the ROM 204 also stores a program that can detect any hardware errors of the child seat 13 and/or the passenger detection sensor 133. A RAM (random access memory) 205 is used as a work area upon executing the communication program, and temporarily stores variable parameters, and the like. These arrangements are connected to each other via a bus 209, and are controlled by a CPU 201 which operates in accordance with the control program stored in the ROM 204.

<Communication Arrangement Between Control Unit and Seat Sensor Unit>

Serial communications between the control unit 11 and the seat sensor unit 18 will be described below with reference to FIGS. 5 and 6.

Figure 5:
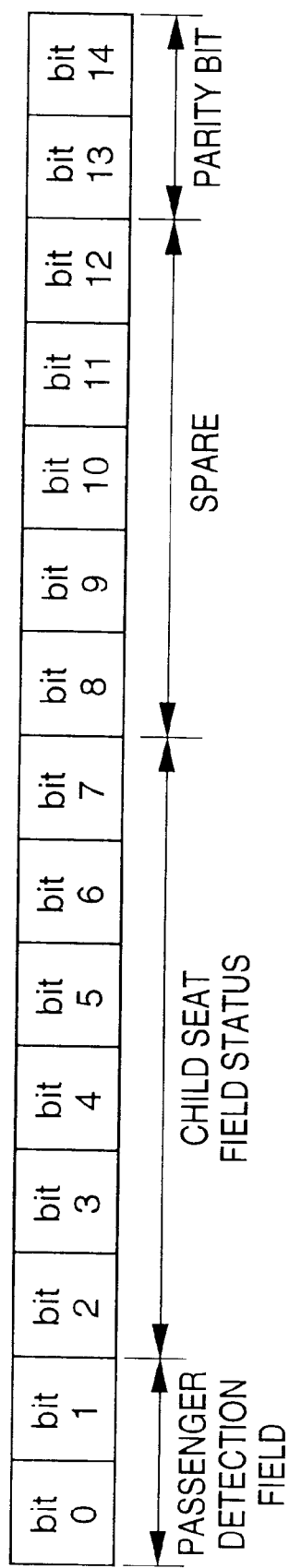
FIG. 5 shows the communication format according to the first embodiment of the present invention.

FIG. 5 shows the communication format according to the first embodiment of the present invention. In this embodiment, for example, the serial communications between the control unit 11 and seat sensor unit 18 are done using a protocol consisting of 13 data bits and 2 parity bits shown in FIG. 5. Assignment of these bits will be explained below. Bits 0 and 1 form a passenger detection field which represents the detection result of a passenger at the front passenger seat by the passenger detection sensor 133. Bits 2 to 7 form a child seat status field which represents the attached state of the child seat 12. Bits 8 to 12 are spare bits. Bit 13 is a party bit for odd bits, and bit 14 is a party bit for even bits. Using these parity bits, the communication interface 102 of the control unit 11 detects communication errors using a general method. In this embodiment, "0" and "1" of these bits are expressed using different bit lengths. Assume that serial data with such format is transmitted from the seat sensor unit 18 to the control unit 11 at a predetermined period. FIG. 6 shows this example.

Figure 6:
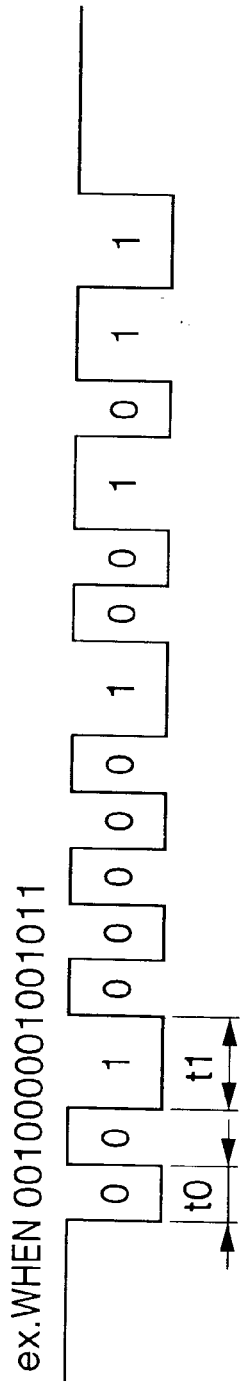
FIG. 6 is an explanatory view of an example of communication data according to the first embodiment of the present invention.

FIG. 6 is an explanatory view of an example of communication data according to the first embodiment of the present invention, and shows the state of transmitted data "001000001001011". Note that a description of the actual contents expressed by combinations of bits "0" or "1" will be omitted, and the data to be transmitted from the seat sensor unit 18 to the control unit 11 will be described later with reference to FIG. 10.

<Communication Between Front Passenger Seat and Child Seat>

Communications between the front passenger seat 13 and child seat 12 will be described below. In this embodiment, radio communications between the front passenger seat 13 and child seat 12 are used for detecting whether or not the child seat 12 is attached to the front passenger seat 13, and detecting the attached state of the child seat 12 if it is attached. The communications will be briefly described below. The transmission antenna 132 on the front passenger seat 13 side always transmits the predetermined frequency Fa. When the child seat 12 is attached to the front passenger seat 13, the transponder 121 equipped in the child seat 12 receives the frequency Fa from the transmission antenna 132, and transmits a predetermined frequency Fb different from that frequency Fa. Based on the reception state of this frequency Fb by the reception antenna 131F and/or the reception antenna 131R on the front passenger seat 13 side, the presence/absence of attachment of the child seat 12 and its direction are detected. In this embodiment, assume that the transponder 121 has a structure which is passively driven by the frequency Fa from the transmission antenna 132. Hence, assume that the frequency Fa has an output which is capable of driving the transponder 121. The reason why such arrangement is adopted is that when the child seat 12 uses a conventional battery-driven transmission/reception circuit, interruption of its transmission/reception arising from short battery capacity or rough handling may pose a serious safety problem. Hence, the transponder 121 more preferably adopts a sealed structure to prevent short-circuiting or the like caused by liquids. Note that the child seat may comprise, e.g., a transmission circuit and the front passenger seat may comprise a reception circuit if such problems can be solved.

The transponder 121 has a buzzer (and/or a lamp; not shown), and makes self diagnosis when it starts operation in response to a radio wave from the transmission antenna 132. If the transponder is normal, the buzzer produces sound for a predetermined period of time (and/or the lamp is kept ON during operation of the transponder 121). With this arrangement, the user can check if the child seat has failed.

The arrangements of the front passenger seat 13 and child seat 12 will be described below with reference to FIGS. 7 and 8.

Figure 7:
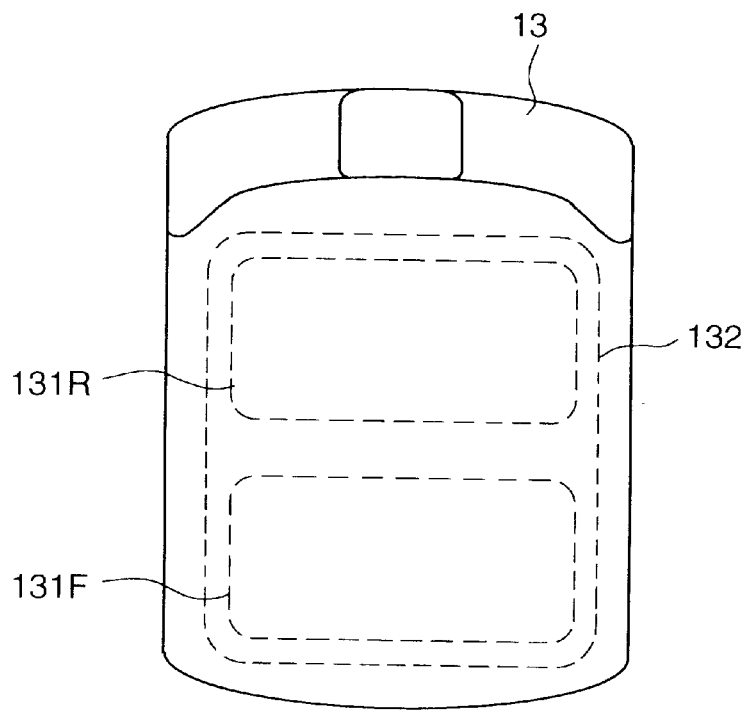
FIG. 7 is an explanatory view of an antenna equipped in a front passenger seat 13 according to the first embodiment of the present invention.

FIG. 7 is an explanatory view of the antennas equipped in the front passenger seat 13 according to the first embodiment of the present invention. FIG. 7 illustrates the front passenger seat 13 when viewed from the above. Inside the seat surface of the seat, the transmission antenna 132 for externally transmitting a signal of the frequency Fa output from the transmission circuit 202 of the seat sensor unit 18, and the reception antennas 131F and 131R for respectively inputting the externally received signals to the reception circuits 203F and 203R of the seat sensor unit 18 are arranged. In this embodiment, as shown in FIG. 7, the transmission antenna 132 has a rectangular shape having nearly the same size as that of the seat surface, and the reception antennas 131F and 131R have rectangular shapes respectively having nearly the same sizes as those of the front and rear halves of the seat surface. The reception circuits 203F and 203R of the seat sensor unit 18 receive the frequency Fb from the transponder 121. The CPU 201 compares the relative strengths of the signals received by these two reception circuits to determine one of the reception antenna ranges where the transponder 121 is located. Independently of the determined reception antenna range, if the signal strengths of the two reception circuits are lower than a predetermined value, it is determined that the child seat 12 is not normally attached (offset from a predetermined position).

Figure 8:
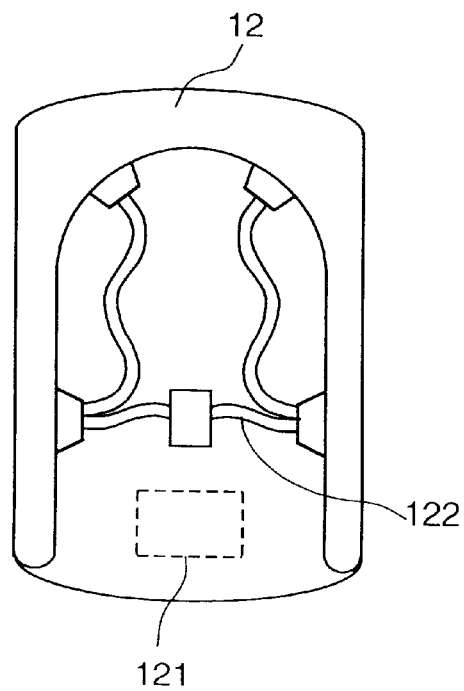
FIG. 8 is an explanatory view of a transponder equipped in a child seat 12 according to the first embodiment of the present invention.

FIG. 8 is an explanatory view of the transponder equipped in the child seat 12 according to the first embodiment of the present invention. FIG. 8 illustrates the child seat 12 when viewed from the above, and the transponder 121 is arranged on the front side of the interior or button portion of the seat surface. Note that the child seat 12 also has seatbelts 122.

<Attached State of Child Seat>

The attached state of the child seat 12 to the front passenger seat 13 will be explained below with reference to FIGS. 9A to 9D.

FIGS. 9A to 9D show various attached states of the child seat according to the first embodiment of the present invention. FIGS. 9A to 9D respectively depict the attached or placed states of the child seat 12 to or on the front passenger seat 13 as the positional relationship among the reception antennas 131F and 131R of the front passenger seat 13, and the transponder 121 of the child seat 12 (they are indicated by the solid lines) for the sake of simplicity. The arrow points in the front side of the front passenger seat 13. The states shown in FIGS. 9A to 9D will be described in turn below.

Figure 9A:
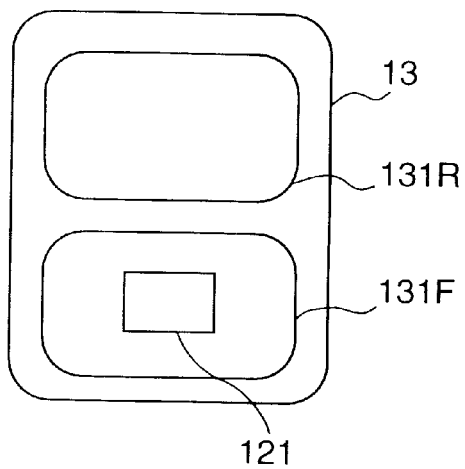
FIGS. 9A to 9D show variations of the attached state of the child seat according to the first embodiment of the present invention.

FIG. 9A shows the state wherein the child seat 12 is normally attached facing front, and the transponder 121 is located within the range of the reception antenna 131F. In this state, the seat sensor unit 18 receives the frequency Fb from the transponder 121 by the reception circuit 203F, and detects that the child seat 12 is normally attached facing front.

Figure 9B:
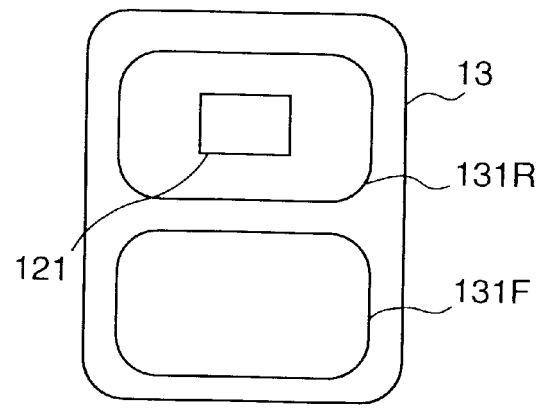

FIG. 9B shows the state wherein the child seat 12 is normally attached facing rear, and the transponder 121 is located within the range of the reception antenna 131R. In this state, the seat sensor unit 18 receives the frequency Fb from the transponder 121 by the reception circuit 203R, and detects that the child seat 12 is normally attached facing rear.

Figure 9C:
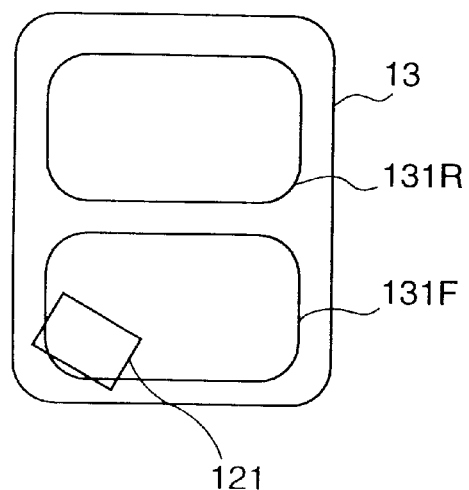

FIG. 9C shows the state wherein the child seat 12 is obliquely attached facing front, and the transponder 121 is located within the range of the reception antenna 131F. In this state, the seat sensor unit 18 determines abnormality since the reception circuit 203F cannot receive a predetermined signal strength due to offset of the child seat 12. Also, the seat sensor unit 18 makes a similar decision when the child seat 12 is offset facing rear.

Figure 9D:
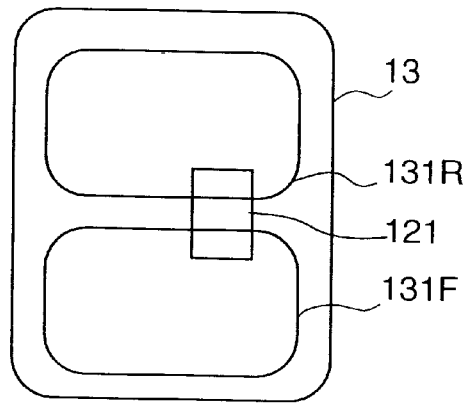

FIG. 9D shows the state wherein the child seat 12 is placed facing sideways, and the transponder 121 is located to extend over both the ranges of the reception antennas 131F and 131R. In such state, the seat sensor unit 18 compares the relative signal strengths obtained by the reception circuits 203F and 203R and determines that the child seat 12 is placed facing sideways.

<Necessity Decision of Airbag Deployment>

Necessity decision of airbag deployment in the airbag system of this embodiment will be described in detail below with reference to FIG. 10.

FIG. 10 is a table for explaining necessity decision of airbag deployment in the airbag system in the first embodiment of the present invention.

Cells in the column direction in FIG. 10 contain decision factors upon deciding the necessity of airbag deployment in the control unit 11. The individual factors will be explained below.

"Child seat (C S in FIG. 10) position offset" represents position offset of the child seat 12 detected by the seat sensor unit 18.

"Input signal abnormality" represents that a signal or signals input from the child seat 12 and/or passenger detection sensor 133 to the seat sensor unit 18 are not predetermined one.

"Hardware error" represents hardware abnormality of the child seat 12 and/or passenger detection sensor 133.

"Front-facing C S detection" represents the case wherein the seat sensor unit 18 detects that the child seat 12 is attached facing front.

"Rear-facing C S detection" represents the case wherein the seat sensor unit 18 detects that the child seat 12 is attached facing rear.

"C S absence" represents the case wherein the seat sensor unit 18 cannot detect any child seat 12 and the case wherein the seat sensor unit 18 detects that hardware of the child seat 12 has fatally failed.

The above-mentioned decision factors correspond to the contents of the communication data shown in FIG. 5.

Cells in the row direction in FIG. 10 contain decision factors upon deciding the necessity of airbag deployment in the control unit 11. The individual factors will be explained below.

"Passenger detection" represents the case wherein the passenger detection sensor 133 detects the presence of a passenger.

"Passenger non-detection" represents the case wherein the passenger detection sensor 133 does not detect any passenger.

"Passenger detection sensor error" represents that hardware of the passenger detection sensor 133 has fatally failed.

The above-mentioned decision factors correspond to the contents of the communication data shown in FIG. 5.

In FIG. 10, "A B" indicates the passenger-side airbag 3, and "○" indicates permission of deployment; "X" indicates inhibition of deployment. "Status indication" represents the ON/OFF state of the status indication lamps 151 and 153, and "ON" indicates the ON state of the lamps (the deployment inhibition state of the passenger-side airbag 3 in this embodiment); "OFF indicates the OFF state of the lamps (the deployment permission state of the passenger-side airbag 3 in this embodiment). "Warning indication" indicates the ON/OFF state of the failure warning lamp 152, and "ON indicates the ON state of the lamp (hardware abnormality of the passenger detection sensor 133 due to its fatal failure or determined by the self diagnosis function, hardware abnormality of the child seat 12 determined by the self diagnosis function in this embodiment); "OFF" indicates the OFF state of the lamp (normal operations of the passenger detection sensor 133 and the seat sensor unit 18 in this embodiment).

The contents of the individual cells in FIG. 10 will be explained below.

In case of "C S position offset", the passenger-side airbag 3 is inhibited from deploying irrespective of the detection state of a passenger in the front passenger seat 13. In this case, although the child seat position is offset, it is actually detected that the child seat 12 is attached facing front or rear. The reason why the airbag is inhibited from deploying in case of position offset is that top priority is given to inhibition of deployment of the passenger-side airbag 3 to guarantee the safety for the rear-facing child seat 12, since the child seat 12 itself has the seatbelts 122. Note that the position offset allowable range may be narrowed by reducing the sizes of the reception antennas 131F and 131R, and adjusting the output of the transmission signal and/or reception signal.

In case of "input signal abnormality", the passenger-side airbag 3 is permitted to deploy except for passenger non-detection. This is because when a passenger is detected, the airbag must be permitted to deploy, as a matter of course, and even when the passenger detection sensor 133 has fatally failed, a passenger may be sitting in the front passenger seat.

In case of "hardware error", the passenger-side airbag 3 is permitted to deploy except for passenger non-detection. This is because when a passenger is detected, the airbag must be permitted to deploy, as a matter of course, and even when the passenger detection sensor 133 has fatally failed, a passenger may be sitting in the front passenger seat.

In case of "front-facing C S detection", the passenger-side airbag 3 is permitted to deploy irrespective of the detection state of a passenger in the front passenger seat 13. This is because it is detected that the child seat 12 is normally attached facing front.

In case of "rear-facing C S detection", the passenger-side airbag 3 is inhibited from deploying irrespective of the detection state of a passenger in the front passenger seat 13. This is because it is detected that the child seat 12 is normally attached facing rear.

In case of "C S absence", the passenger-side airbag 3 is permitted to deploy except for passenger non-detection. This is because when a passenger is detected, the airbag must be permitted to deploy, as a matter of course, and even when the passenger detection sensor 133 has fatally failed, a passenger may be sitting in the front passenger seat.

<Status Determination>

Status determination will be described below with reference to FIGS. 11 to 15. This processing prevents the deployment necessity control state of the passenger-side airbag 3 from being frequently switched due to temporal changes in output from the individual status detection units. For example, even when the output from the passenger detection sensor 133 has changed, a status change is determined after that state continues for a predetermined period of time. The arrangement of the status determination to be described below (FIGS. 11 to 15) is used not only in determination of passenger detection but also detection of the presence/absence, direction, and position offset of the child seat 12 in other embodiments. Note that timer setting values must be appropriately set in correspondence with each processing.

FIGS. 11 to 13 show the internal parameters used in status determination according to an embodiment of the present invention (upon determining passenger detection). FIG. 11 defines a flag SPPD indicating that the passenger detection sensor 133 detects the presence of a passenger, and a flag XPPD indicating that the passenger present state has been determined. FIG. 12 defines a set counter CSPPD and a reset counter CRPPD used for counting the duration of the passenger detection state. FIG. 13 defines set timers TSPPD1 and TSPPD2 and reset timers TRPPD1 and TRPPD2 used for determining the passenger detection state. For example, 4 and 8 sec are set in these timers.

Figure 14:
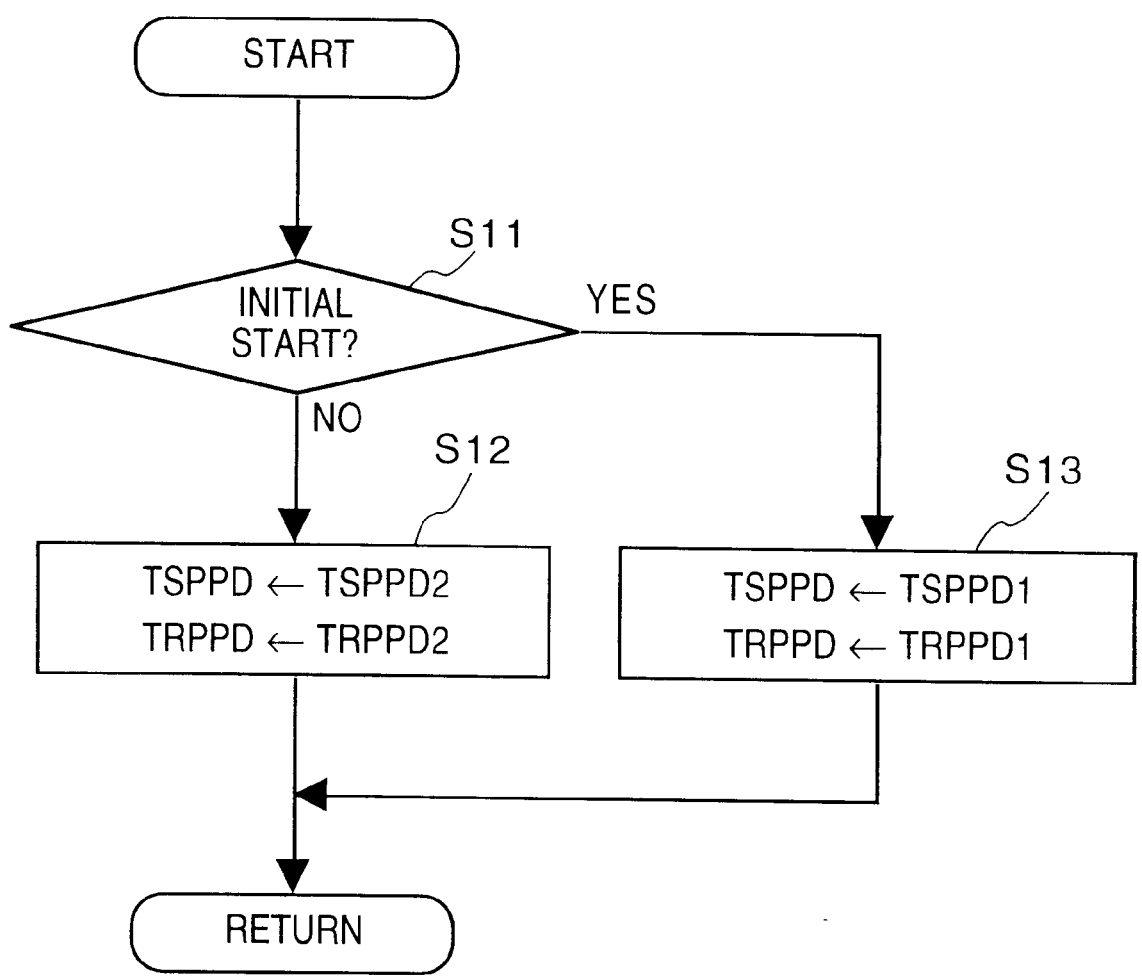
FIG. 14 is a flow chart showing the processing for setting a status determination time according to the first embodiment of the present invention (upon determining passenger detection)

FIG. 14 is a flow chart showing the processing for setting a status determination time according to the first embodiment of the present invention. This setting processing is executed by the control unit 11 to determine the passenger detection state within a short period of time upon initial start by turning on an ignition key (not shown).

In FIG. 14, it is checked if the automobile is initially started by turning on the ignition key (step S11). If NO in step S1, 8 sec (TSPPD2) are set in the status determination set timer value (TSPPD) and 8 sec (TSPPD2) are set in the status determination reset timer value (TRPPD) in step S12. On the other hand, if YES in step S1, 4 sec are similarly set in the individual timers in step S13, as in step S12.

Figure 15:
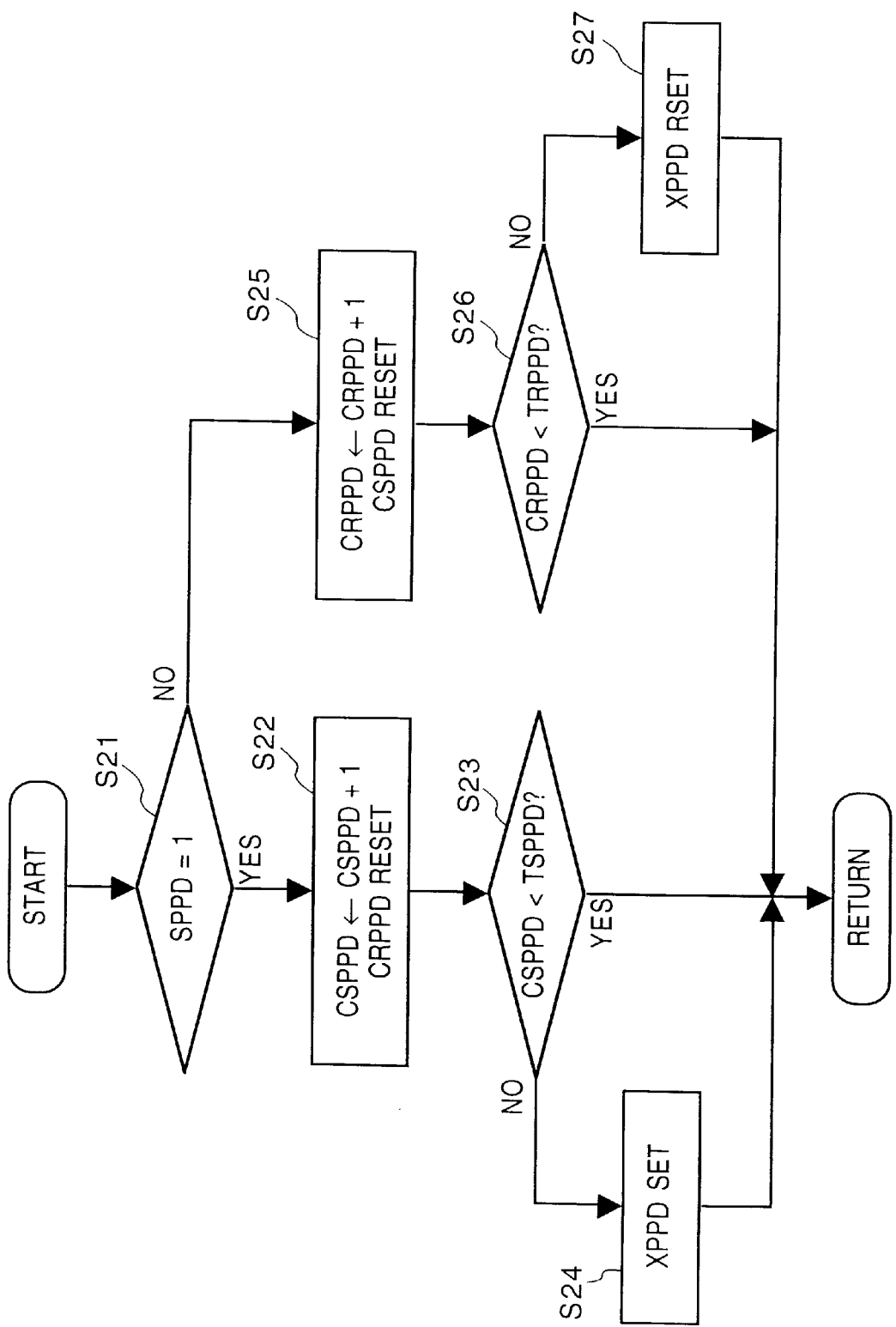
FIG. 15 is a flow chart showing status determination according to the first embodiment of the present invention (upon determining passenger detection)

FIG. 15 is a flow chart showing status determination according to the first embodiment of the present invention, which is executed by the control unit 11 to determine the presence/absence of a passenger who is sitting in the front passenger seat 13 using the status determination time set by the processing in FIG. 14.

In FIG. 15, it is checked if the flag SPPD as the current output status of the passenger detection sensor 133 is "1" (1 indicates the presence of a passenger) (step S21). If YES in step S21, CSPPD is incremented by 1 and CRPPD is reset (step S22). The current count value of CSPPD is compared with the current value of TSPPD set in the processing of FIG. 14 (step S23). If YES in step S23, since the presence of a passenger cannot be determined yet, the flow returns. On the other hand, if NO in step S23, since the presence of a passenger can be determined, XPPD is set to "1" (step S24), and the flow then returns. If NO in step S21, CRPPD is incremented by 1 and CSPPD is reset (step S25). The current count value of CRPPD is compared with the current value of TRPPD set in the processing of FIG. 14 (step S26). If YES in step S26, since the absence of a passenger cannot be determined yet, the flow returns. On the other hand, if NO in step S26, since the absence of a passenger can be determined, XPPD is reset to "0" (step S27), and the flow then returns.

<Switching of Necessity of Deploying Passenger-side Airbag>

Figure 16:
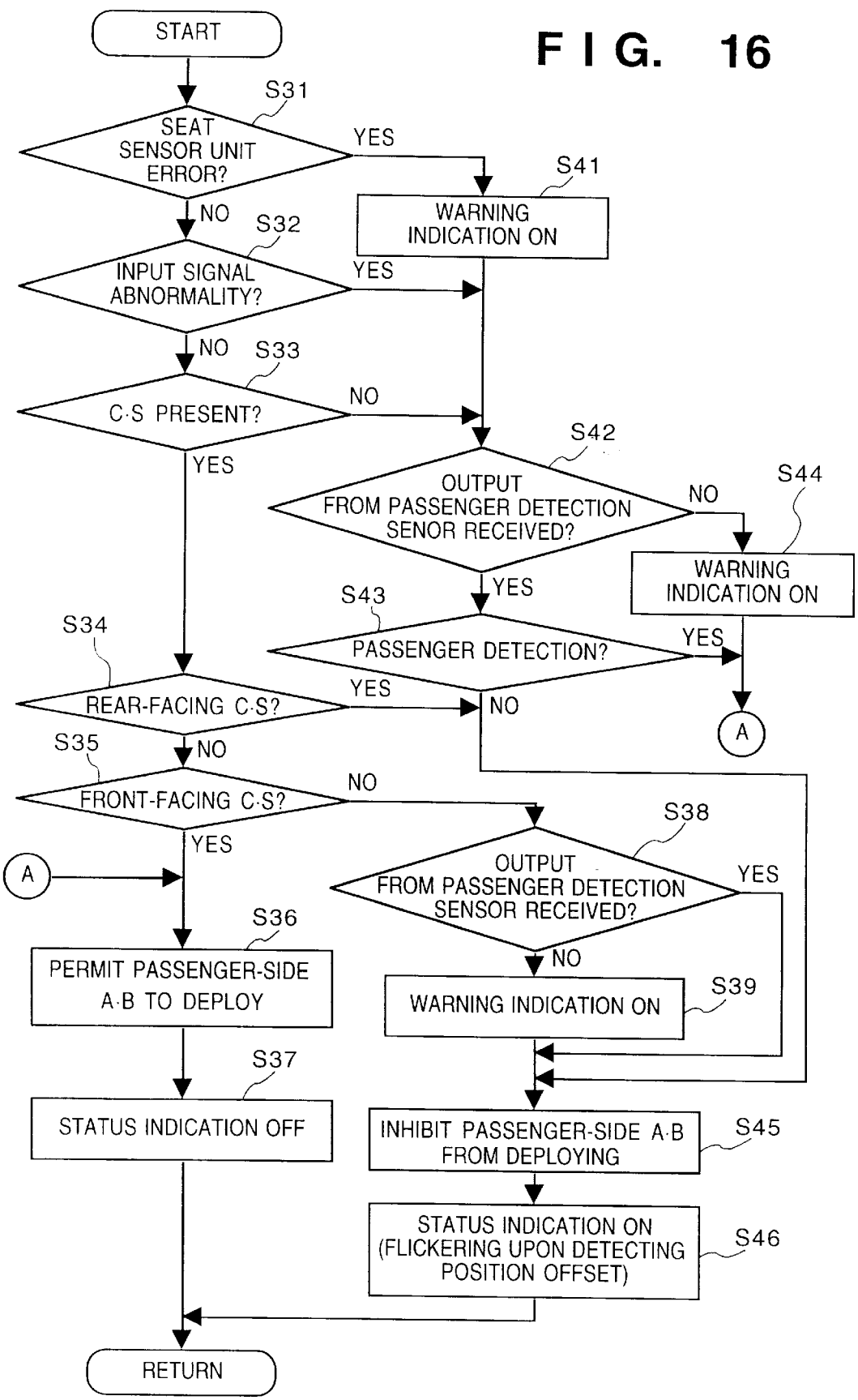
FIG. 16 is a flow chart showing switching of the necessity of deploying a passenger-side airbag according to the first embodiment of the present invention.

FIG. 16 is a flow chart showing switching of the necessity of deploying the passenger-side airbag according to the first embodiment of the present invention. This switching is done by the control unit 11 on the basis of the above-mentioned communication data received from the seat sensor unit 18.

In FIG. 16, when the processing is started by turning on the ignition key, it is checked if the seat sensor unit 18 is defective (step S31). If YES in step S31, the failure warning lamp 152 is turned on (step S41), and the flow advances to step S42 (to be described later). On the other hand, if NO in step S31, input signal abnormality is checked (step S32). If YES in step S32, the flow advances to step S42 (to be described later) to check if the output from the passenger detection sensor 133 is received.

If input signal abnormality is not determined in step S32, it is checked in turn from steps S33 to S35 if the child seat 12 is present and if it faces front or rear if the seat 12 is present.

If it is determined in step S33 that the child seat 12 is absent, it is checked if the output form the passenger detection sensor 133 is received (step S42). If NO in step S42, since the passenger detection sensor 133 has failed, the failure warning lamp 152 is turned on (step S44), and the flow advances to step S36 (to be described later). On the other hand, if YES in step S42, the passenger detection state is checked (step S43). If YES in step S43, the flow advances to step S36 (to be described later) to permit the passenger-side airbag 3 to deploy. On the other hand, if NO in step S43, the passenger-side airbag 3 is inhibited from deploying (step S45), and the status indication lamps 151 and 153 are turned on (step S46). After that, the flow returns.

If it is determined in step S34 that the child seat 12 faces rear, the processing in step S45 and the subsequent steps is executed similarly.

On the other hand, if it is determined in step S35 that the child seat 12 does not face front, this means that the position of the child seat 12 is offset. In this case, it is checked if the output from the passenger detection sensor 133 is received (step S38). If NO in step S38, since the passenger detection sensor 133 has failed, the failure warning lamp 152 is turned on (step S39), and the passenger-side airbag 3 is inhibited from deploying (step S45). On the other hand, if YES in step S38, the flow directly advances to step S45 to inhibit the passenger-side airbag 3 from deploying. In step S46, the status indication lamps 151 and 153 are made to flicker to inform the passenger of position offset of the child seat 12. This is to allow the passenger to correct position offset by checking the operation state of the status indication lamps 151 and 153 when he or she notices any position offset of the child seat 12 by the flickering status indication lamps 151 and 153. That is, when the front-facing child seat 12 causes position offset and position offset correction is made by the passenger, the lamps change from the flickering state to the OFF state. On the other hand, when the rear-facing child seat 12 causes position offset and position offset correction is made by the passenger, the lamps change from the flickering state to the ON state. The passenger uses such changes in lamp state in making decision upon correcting position offset.

<Passenger Detection by Seat Sensor Unit>

Passenger detection by the seat sensor unit 18 will be explained below.

Assuming the "C S absence" state described above, since the state wherein the child seat 12 is absent includes a case wherein the child seat 12 has fatally failed, there may be a case wherein the child seat 12 is attached facing rear to the front passenger seat 13 in practice, but cannot be detected. As described above, the transponder 121 has a buzzer (and/or a lamp; not shown), and the user can confirm the operation state of the child seat 12. In this case, as shown in FIG. 10, when the passenger detection sensor 133 detects a passenger, the passenger-side airbag 3 is permitted to deploy. Such permission is not preferable when an infant is sitting in the child-seat 12 in practice.

To solve this problem, when the absence of the child seat 12 is detected, an output is generated so that passenger detection by the passenger detection sensor 133 is inhibited except for a predetermined state in the passenger detection processing to be described later, i.e., no passenger is detected. With such output, when the child seat 12 that has fatally failed is attached to the front passenger seat 13 in practice, and an infant is sitting in that seat, the passenger-side airbag 3 is inhibited from deploying. The reason why the passenger-side airbag 3 is inhibited from deploying in the above-mentioned state is that a shock onto an infant upon deployment of the passenger-side airbag 3 poses a serious problem when the child seat 12 is attached facing rear rather than when it is attached in a direction other than the rear-facing direction (assume that an infant is fixed to the child seat 12 by the seatbelts 122).

The passenger detection by the seat sensor unit 18 in this embodiment will be described in detail below. Upon detecting the output from the passenger detection sensor 133 using a weight sensor, the seat sensor unit 18 compares the output with a predetermined threshold value A. If the output is larger than the threshold value, the unit 18 determines passenger detection (the presence of a passenger). In this embodiment, assuming that the weight of the child seat 12 is B (kg) and the maximum prescribed weight of an infant who can sit in the child seat 12 is C (kg), if A>B+C holds, the seat sensor unit 18 determines the absence of a passenger and transmits a signal indicating passenger non-detection to the control unit 11 in accordance with the control protocol shown in FIG. 5. On the other hand, since the control unit 11 receives the signal indicating passenger non-detection from the seat sensor unit 18, the flow advances in turn to steps S33, S42, S43, and S45 to inhibit the passenger-side airbag 3 from deploying in the flow chart in FIG. 16.

In this embodiment, the passenger is informed of the operation state of the airbag system via lamps. However, the present invention is not limited to such specific means, and a voice output may also be used.

[Second Embodiment]

The second embodiment that uses a vehicle velocity signal from a vehicle velocity sensor will be explained below. The outline of this embodiment will first be described. In order to prevent the deployment necessity switching control of the airbag from being improperly done due to noise components temporarily superposed on the output from various sensors in the above-mentioned airbag system, the vehicle velocity is also used as a decision factor upon switching the necessity of deploying the airbag under the assumption that the passenger rarely changes his or her sitting position, posture, and the like during travel of the vehicle. A detailed description of the same portions as those in the first embodiment will be omitted, and the characteristic features of the second embodiment will be mainly explained below.

Figure 17:
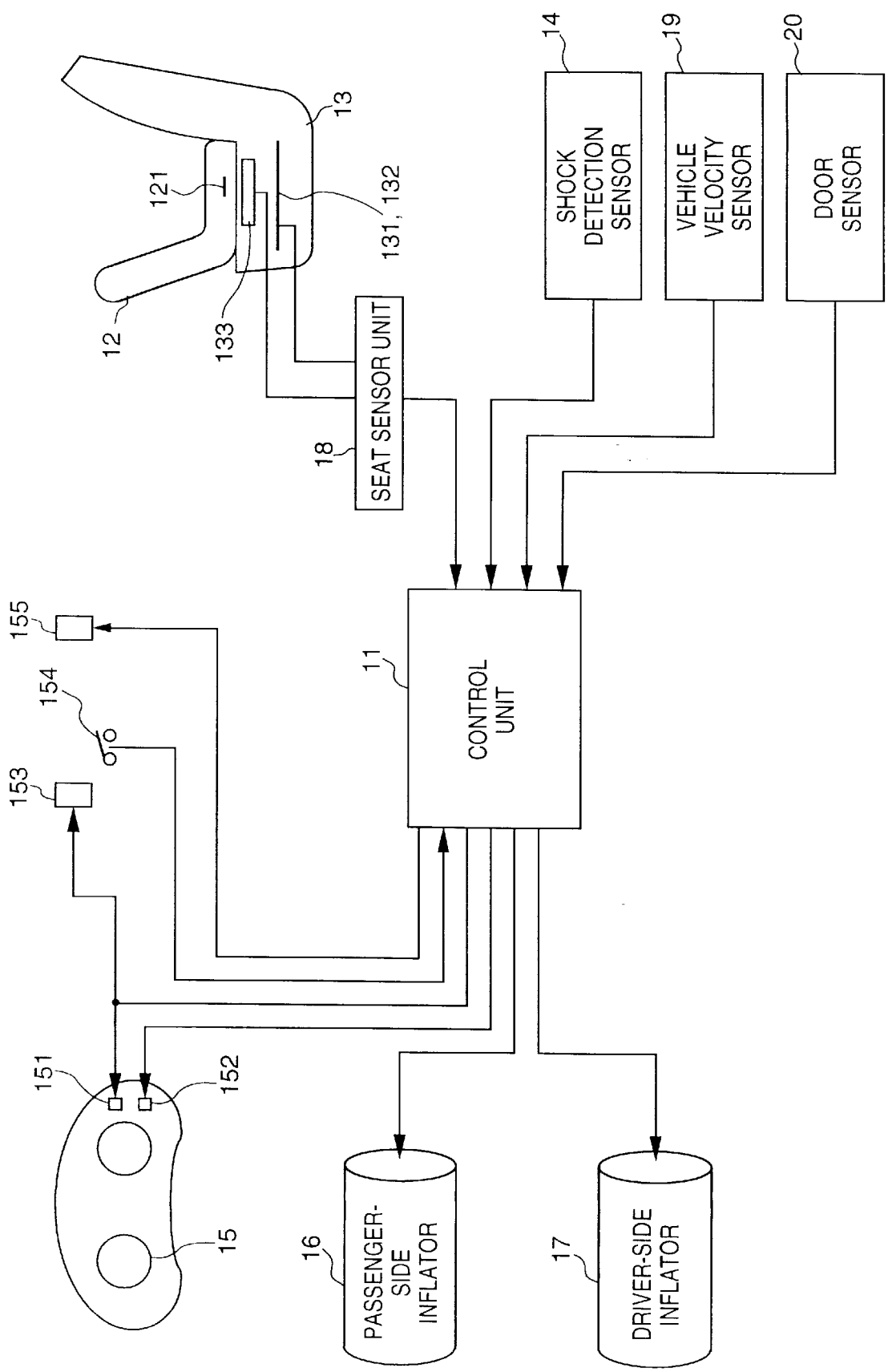
FIG. 17 is a schematic diagram showing the arrangement of an airbag system according to the second embodiment of the present invention.

FIG. 17 is a schematic diagram showing the arrangement of an airbag system according to the second embodiment of the present invention. In FIG. 17, the differences from FIG. 1 (first embodiment) are that a vehicle velocity signal from a vehicle velocity sensor 19 for detecting the vehicle velocity of the automobile 1 and a door status signal from a door sensor 20 which indicates the door open/close state for a modification to be described later are input to the sensor input interface 103 of the control unit 11, and a warning signal is output from the status notifying interface 108 of the control unit 11 to a warning buzzer 155 (a lamp may be used instead).

Figure 18:
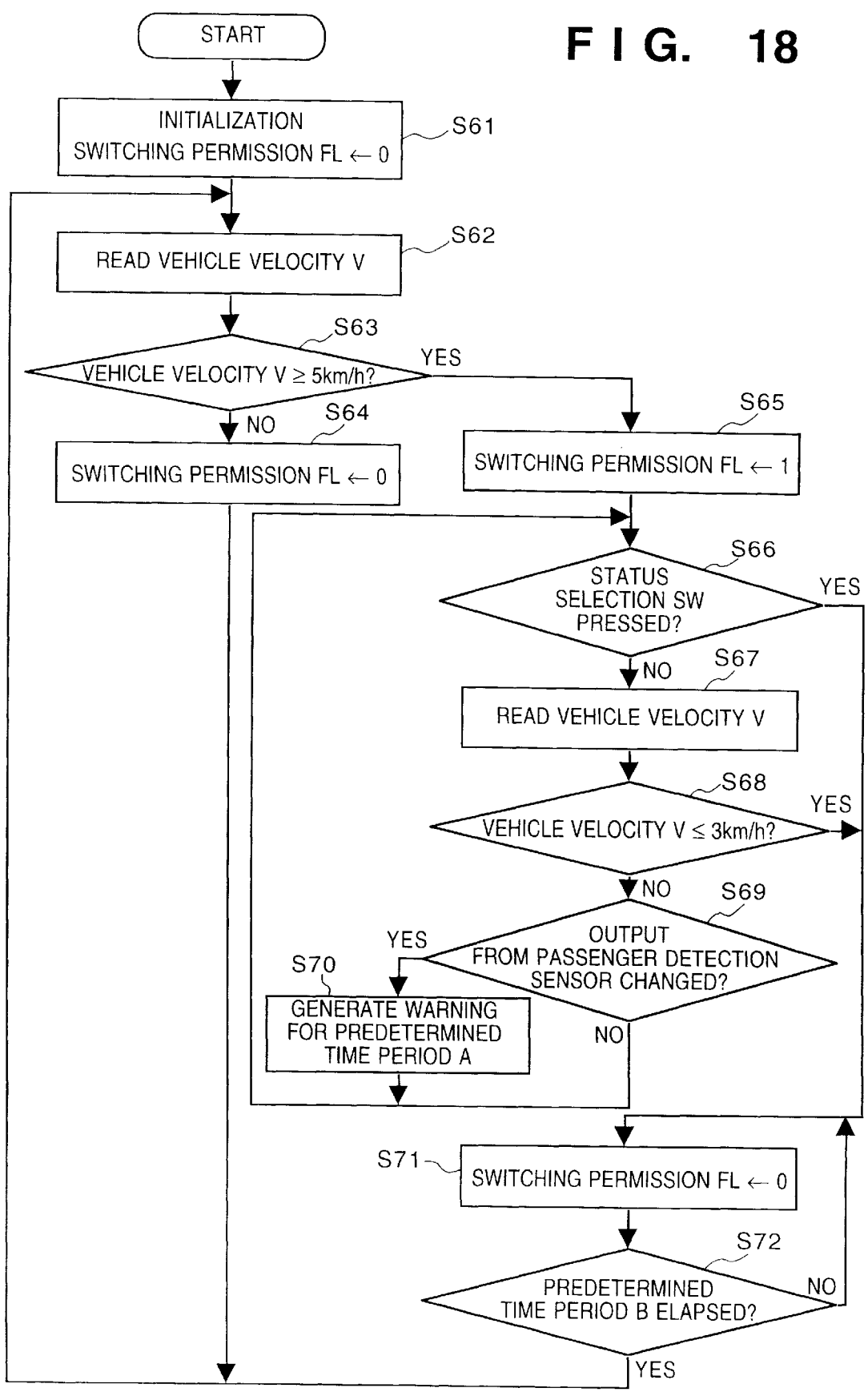
FIG. 18 is a flow chart showing permission/inhibition of airbag deployment switching control according to the second embodiment of the present invention.

FIG. 18 is a flow chart for detecting changes in output from the passenger detection sensor 133 in the flow chart of the permission/inhibition processing of the airbag deployment switching control according to the second embodiment of the present invention. In practice, the same flow charts as in FIG. 18 are prepared in correspondence with detection of the presence/absence, direction, and position offset of the child seat 12.

When the processing is started upon turning on the ignition key, the control unit 11 initializes to zero a switching permission flag (FL) that indicates permission/inhibition of switching by airbag deployment necessity switching control (to be described later) (step S61). In the following description, FL=0 indicates permission of switching, and FL=1 indicates inhibition of switching. The current vehicle velocity V is read from the vehicle velocity sensor 19 in step S62, and it is checked in step S63 if the read velocity V is, e.g., 5 km/h or higher, so as to determine if the vehicle is traveling. If NO in step S63, "0" is set in the switching permission flag, and the flow returns to step S62. On the other hand, if YES in step S63, since the vehicle is currently traveling, and permission/inhibition of airbag deployment must not be switched, "1" is set in the switching permission flag, and the flow advances to step S66.

During maneuvering of the vehicle, the routine in steps S66 to S70 is looped. It is checked in step S66 if the passenger has pressed the status selection switch 154. The passenger uses the status selection switch 154 to change the current permission/inhibition status for deployment of the passenger-side airbag 3 if he or she so wishes. If NO in step S66, the current vehicle velocity V is read (step S67), and it is checked in step S68 if the vehicle velocity V is, e.g., 3 km/h or less. If NO in step S68, it is checked if the detection status of the output from the passenger detection sensor 133 has changed (step S69). This indicates that the status of the passenger in the front passenger seat 13 has changed (passenger detection/nondetection) for any causes although the vehicle is currently running. If NO in step S69, since it indicates that the status of the passenger remains the same, the flow returns to step S66. On the other hand, if YES in step S69, since it indicates that the status of the passenger has changed, the warning buzzer 155 is activated for a predetermined time period A in step S70 so as to inform the passenger of the difference between the current status of the front passenger seat 13 and the current deployment permission or inhibition status of the passenger-side airbag 3. After that, the flow returns to step S66.

If YES in step S66, "0" is set in the switching permission flag (step S70), and the flow returns to step S62 after the control waits for an elapse of a predetermined time period B in step S71. The reason why the control waits for the predetermined time period B in step S71 is to prevent deployment permission/inhibition status from being frequently switched. Also, YES is determined in step S66 when the passenger has recognized the difference between the current status of the front passenger seat 13 and the current deployment permission or inhibition status of the passenger-side airbag 3 by the warning given in step S70, and has pressed the status selection switch 154 by himself or herself to remove the difference. If YES in step S68, since the vehicle has nearly come to a halt, the same processing as in step S71 and the subsequent steps above is done.

Switching of the necessity of deploying the passenger-side airbag which can be changed based on the status of the switching permission flag FL controlled by the processing in FIG. 18 above will be explained below with reference to FIGS. 19A and 19B.

Figure 19A:
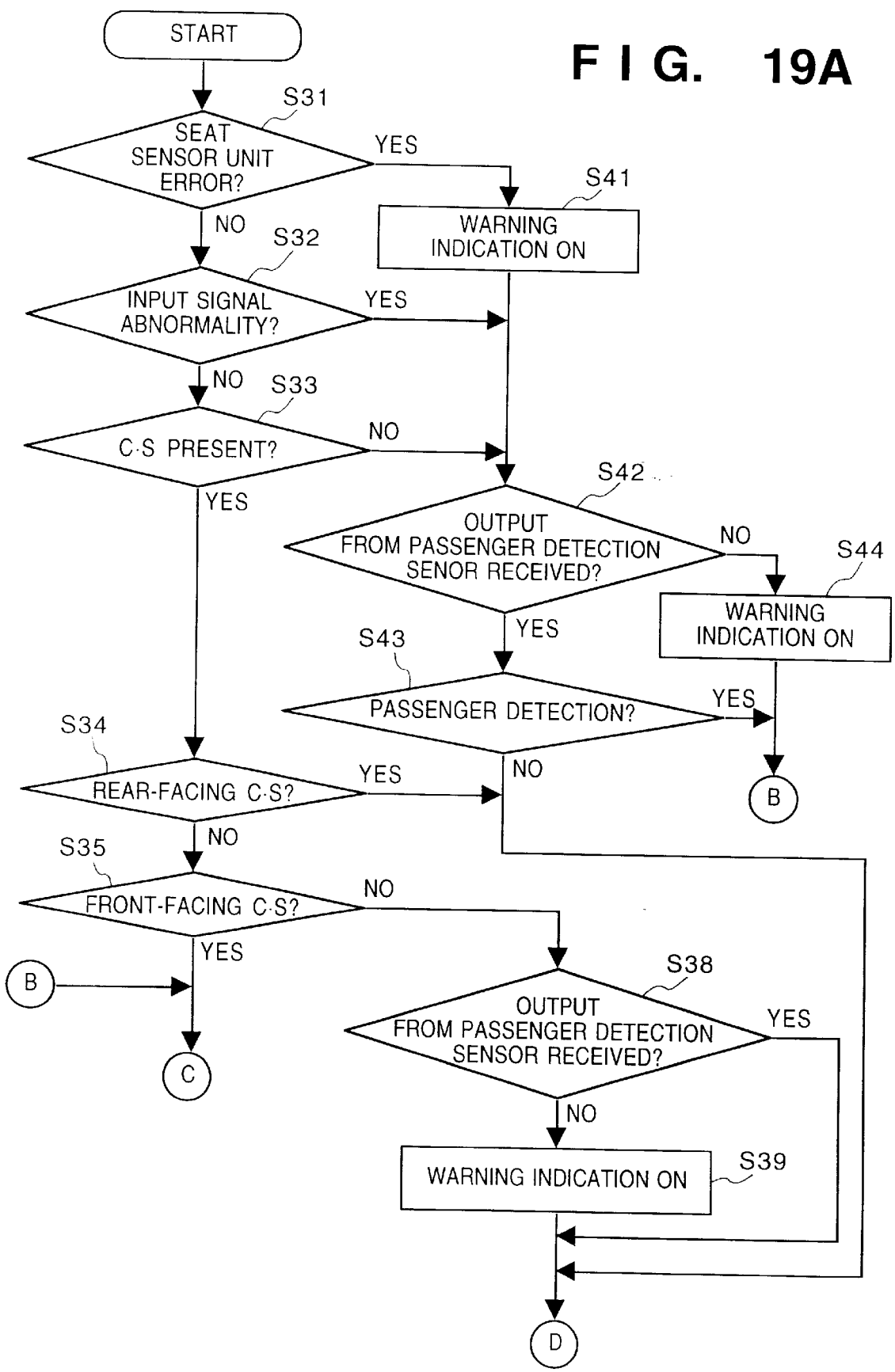
FIGS. 19A and 19B are flow charts showing switching of the necessity of deploying a passenger-side airbag according to the second embodiment of the present invention.
Figure 19B:
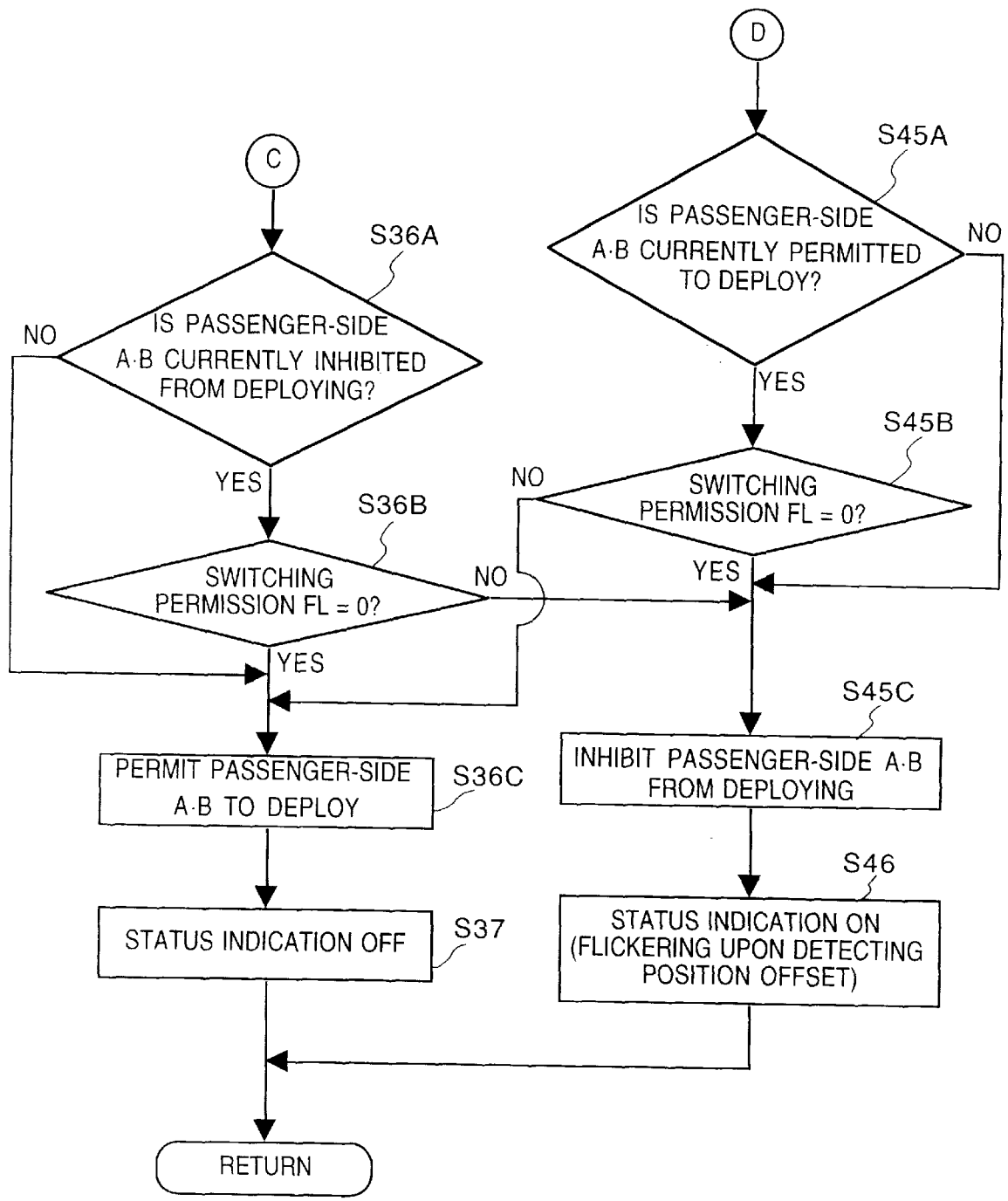

FIGS. 19A and 19B are flow charts showing switching of the necessity of deploying the passenger-side airbag according to the second embodiment of the present invention. FIGS. 19A and 19B are basically the same as the first embodiment (FIG. 16) mentioned above, and only the differences will be explained below.

Prior to permitting deployment of the passenger-side airbag in step S36C, it is checked if the passenger-side airbag is currently inhibited from deploying (step S36A). If YES in step S36A, it is checked if the switching permission flag is "0" (step S36B). If YES in step S36B, the deployment status of the passenger-side airbag is switched to permission in step S36C. On the other hand, if NO in step S36A, since the deployment status of the passenger-side airbag already indicates permission, the flow directly advances to step S36C. Furthermore, if NO in step S36B, since switching is inhibited (FL=1), the flow advances to step S45C to maintain the current deployment inhibition status.

Prior to inhibiting deployment of the passenger-side airbag in step S45C, it is checked if the passenger-side airbag is currently permitted to deploy (step S45A). If YES in step S45A, it is checked if the switching permission flag is "0" (step S45B). If YES in step S36B, the deployment status of the passenger-side airbag is switched to inhibition in step S45C. On the other hand, if NO in step S45A, since the deployment status of the passenger-side airbag already indicates inhibition, the flow directly advances to step S45C. Furthermore, if NO in step S45B, since switching is inhibited (FL=1), the flow advances to step S36C to maintain the current deployment inhibition status.

Modifications of the second embodiment will be explained below.

<First Modification of Second Embodiment>

In this modification, the vehicle velocity V obtained from the vehicle velocity sensor 19 is used in determination of passenger detection and the like described in the first embodiment with the aid of FIGS. 11 to 15, in addition to the permission/inhibition processing of the switching control in the second embodiment described above (in this case, the timer setting values in FIG. 13 satisfy TSPPD1>TSPPD2, and TRPPD1>TRPPD2). More specifically, it is checked in step S11 in the status determination time setting processing (FIG. 14) if the current vehicle velocity equals a predetermined value. If the current vehicle velocity is equal to or larger than the predetermined value, the timers TSPPD and TRPPD used in status determination are set values larger than those used when the vehicle velocity is smaller than the predetermined value. When the vehicle is traveling at a velocity equal to or larger than the predetermined value, the passenger status rarely changes. In this manner, the necessity of airbag deployment is prevented from being fortuitously switched due to noise. Note that the determination processing result of this embodiment using the vehicle velocity V may also be used in FIG. 16 in the first embodiment mentioned earlier.

<Second Modification of Second Embodiment>

This modification executes similar processing to that in the first modification of the second embodiment. In this modification, it is checked in step S11 in the status determination time setting processing (FIG. 14) if the door status signal input from the door sensor 20 indicates that the door on the front passenger seat side of the vehicle is closed. If that door is closed, the timers TSPPD and TRPPD used in status determination are set values larger than those used when the door is open. When the door is closed, since it indicates that the vehicle is likely to be traveling, the passenger status rarely changes, and longer setting times are also used in status determination in such case. In this manner, the necessity of airbag deployment is prevented from being inadvertently switched due to noise. Note that the open/close state of the door on the front passenger seat side is preferably detected but the present invention is not limited to this.

[Third Embodiment]

The third embodiment that uses an acceleration signal from an acceleration sensor will be explained below. The outline of this embodiment will first be described. Assume that a large acceleration acts due to some causes during travel of the vehicle and, for example, the child seat 12 attached on the front passenger seat 13 is offset from its predetermined position. In this case, the airbag system of the first embodiment may detect the changes in position of the child seat 12, and may improperly switch the necessity of airbag deployment even during travel of the vehicle. To solve this problem, an acceleration is also used as a decision factor upon switching the necessity of airbag deployment. The concept will be explained in detail below with reference to FIG. 20.

FIG. 20 is an explanatory view of permission/inhibition of the airbag deployment switching control according to the third embodiment of the present invention. In FIG. 20, when the detection status of the child seat 12 has changed from "presence" to "absence" due to, e.g., changes in position of the child seat 12, if the output value of the acceleration sensor is larger than a predetermined threshold value T, the changes in detection status have arisen from some abnormal cause (e.g., emergency braking, crash, or the like), and switching of the necessity of airbag deployment is inhibited to maintain the control status before the position of the child seat 12 has changed, thus improving the safety. A detailed description of the same portions as those in the first and second embodiments will be omitted, and the characteristic features of the third embodiment will be mainly explained below.

Figure 21:
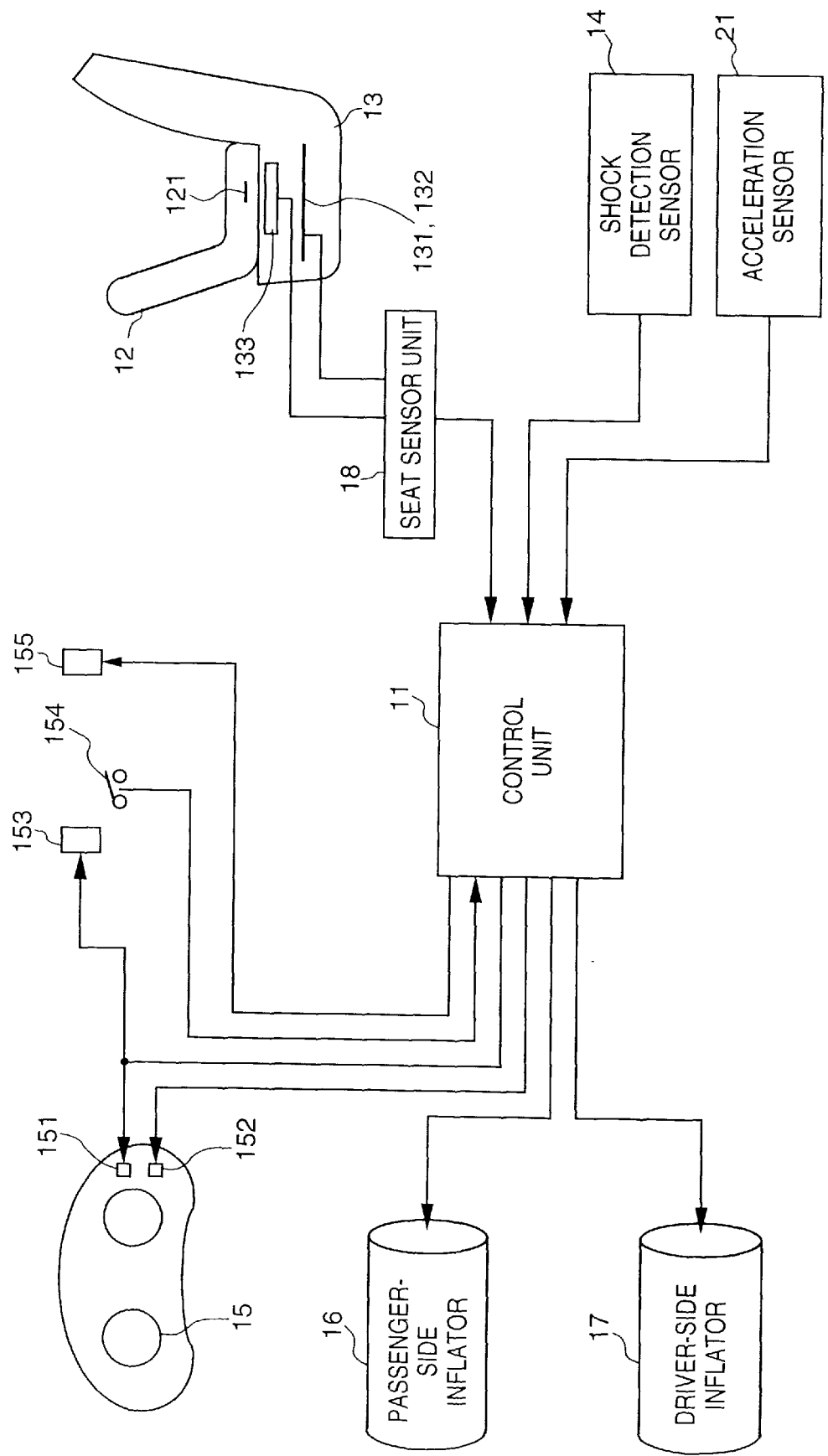
FIG. 21 is a schematic diagram showing the arrangement of an airbag system according to the third embodiment of the present invention.

FIG. 21 is a schematic diagram showing the arrangement of an airbag system according to the third embodiment of the present invention. In FIG. 21, the differences from FIG. 1 (first embodiment) above are that an acceleration signal from an acceleration sensor that detects the acceleration of the automobile 1 is input to the sensor input interface 103 of the control unit 11, and a warning signal is output from the status notifying interface 108 of the control unit 11 to a warning buzzer 155 (a lamp may be used instead).

Figure 22:
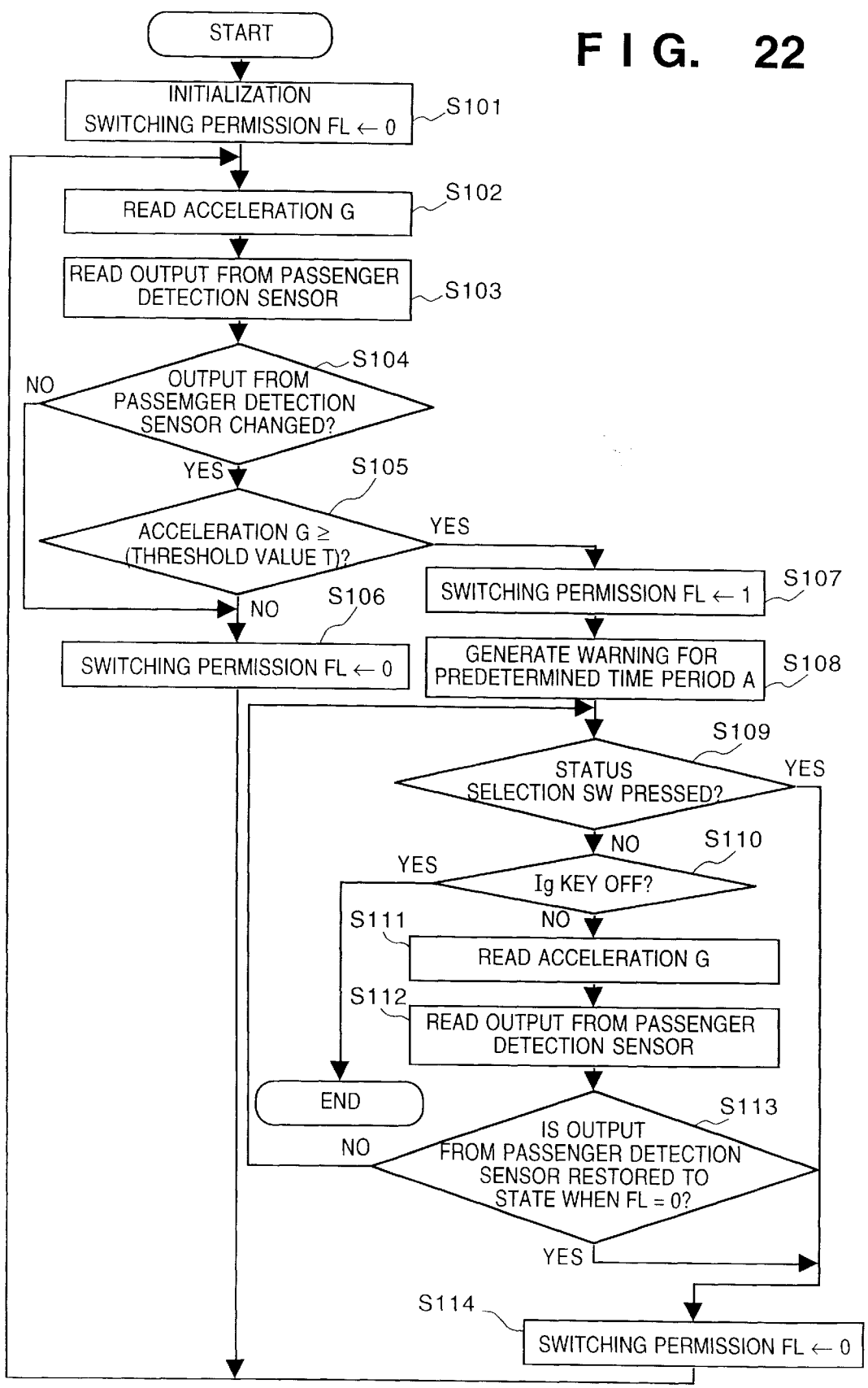
FIG. 22 is a flow chart showing permission/inhibition of airbag deployment switching control according to the third embodiment of the present invention.

FIG. 22 is a flow chart for detecting changes in output from the passenger detection sensor 133 in the flow chart of the permission/inhibition processing of the airbag deployment switching control according to the third embodiment of the present invention. In practice, the same flow charts as in FIG. 22 are prepared in correspondence with detection of the presence/absence, direction, and position offset of the child seat 12. With the flow chart in FIG. 22, the switching permission flag (FL=0 indicates permission of switching, and FL=1 indicates inhibition of switching) is controlled as in the second embodiment to permit/inhibit the switching control of airbag deployment.

When the processing is started upon turning on the ignition key, the control unit 11 initializes the switching permission flag (FL) to zero (step S101). Subsequently, the acceleration signal from the acceleration sensor 21 is read (step S102), and the output from the passenger detection sensor 133 is read (step S103). In step S104, the currently read output from the passenger detection sensor 133 is compared with the previously read value to check if the output has changed. If NO in step S104, a normal state is determined, and "0" is set in the switching permission flag (step S106). The flow then returns to step S102. On the other hand, if YES in step S104, it is checked if the currently read output from the acceleration sensor 21 is larger than a predetermined threshold value T (step S105). If NO in step S10S, a normal state is determined, and "0" is set in the switching permission flag (step S106). After that, the flow returns to step S102.

If YES in step S105, since it indicates that an abnormal state has occurred, "1" is set in the switching permission flag 1 (step S107), and the warning buzzer 155 is activated for a predetermined time period A to call for the attention of the passenger (step S108).

It is then checked in step S109 if the passenger has pressed the status selection switch 154. This is to check if the passenger has recognized the difference between the current status of the front passenger seat 13 and the current deployment permission or inhibition status of the passenger-side airbag 3 as a result of warning in step S108, and has pressed the status selection switch 154 by himself or herself to remove the difference. For example, when the passenger in the front passenger seat 13 is about to move to the back seat in, e.g., a wagon, the driver has done emergency braking at the time of movement. In such case, since the passenger initially sits in the front passenger seat 13, the passenger-side airbag 3 is in the "deployment permission" state. According to the processing of this embodiment, even after that passenger has moved to the back seat, the "deployment permission" state is maintained. The driver (or that passenger) who has recognized this situation presses the status selection switch 154, thereby changing the control status from "deployment permission" to "deployment inhibition". Hence, if it is determined in step S109 that the status selection switch 154 has been pressed, "0" is set in the switching permission flag (step S114), and the flow returns to step S102.

On the other hand, if NO in step S109, the acceleration signal from the acceleration sensor 21 and the output from the passenger detection sensor 133 are read in turn (steps S111 and S112), and the routine in steps S109 to S113 is looped until it is detected that the ignition key is OFF (step S110) or until the output from the passenger detection sensor 113 is restored to the state when the switching permission flag is "0" (step S113). If it is detected in step S110 that the ignition key is OFF, the processing is to end. On the other hand, if YES in step S113, i.e., if the output from the passenger detection sensor 113 is restored to the state when the switching permission flag is "0", "0" is set in the switching permission flag (step S114), and the flow returns to step S102. For example, the output from the sensor 113 is restored to the state of the switching permission flag=0 in step S113 when the posture of the passenger in the front passenger seat 13 changed due to emergency braking but he or she has recovered the normal setting position afterwards. As another example, when the presence/absence of the child seat 12 is detected in the flow chart in FIG. 22, the position of the child seat 12 on the front passenger seat 13 is offset from the predetermined position but the child seat 12 is recovered to the predetermined position by reaction of emergency braking or by the passenger.

Note that switching of the necessity of deploying the passenger-side airbag that is restrained by the permission/inhibition processing in FIG. 22 is the same as that in the flow chart in FIG. 19 of the second embodiment described above, and a detailed description thereof will be omitted.

[Fourth Embodiment]

Figure 23:
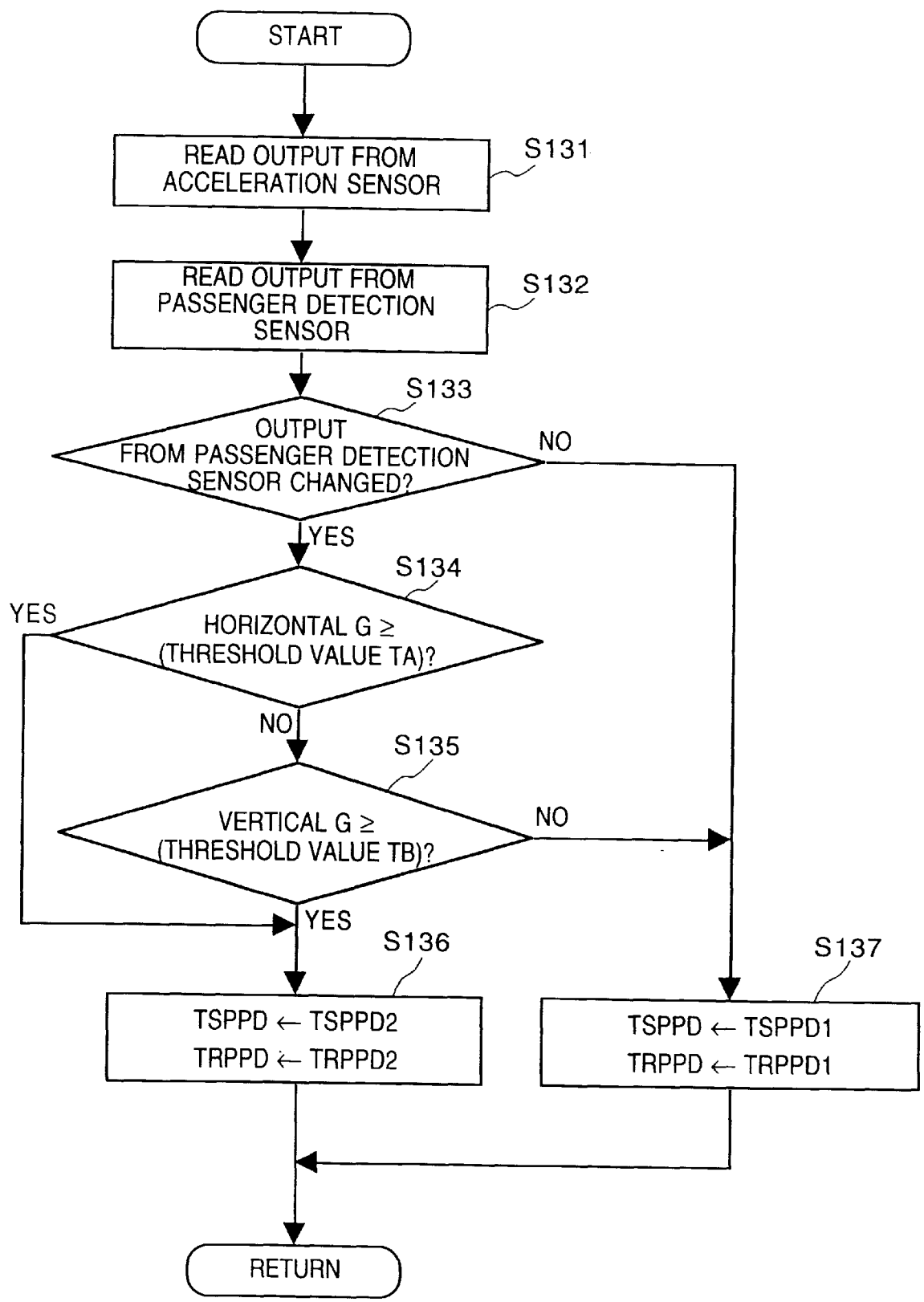
FIG. 23 is a flow chart showing the processing for setting a status determination time according to the fourth embodiment of the present invention (upon determining passenger detection)

In this embodiment, the switching control for the necessity of airbag deployment is similarly prevented from being improperly done in the situation described in the third embodiment described above. Also, in this embodiment, as that prevention means, an acceleration signal obtained from the acceleration sensor 21 is used in passenger detection, and detection of the presence/absence, direction, and position offset of the child seat 12 in the switching processing (FIG. 16) of the necessity of passenger-side airbag deployment in the first embodiment described earlier. More specifically, the processing shown in FIG. 23 is done instead of the status determination time setting processing shown in FIG. 14 in determination of passenger detection and the like described in the first embodiment with the aid of FIGS. 11 to 15. In this embodiment, the acceleration sensor 21 inputs two different acceleration signals, i.e., horizontal and vertical acceleration signals, and TA and TB respectively represent their threshold values.

FIG. 23 is a flow chart for detecting changes in output from the passenger detection sensor 133 in the flow chart showing the status determination time setting processing according to the fourth embodiment of the present invention. In practice, the same flow charts as in FIG. 23 are prepared in correspondence with detection of the presence/absence, direction, and position offset of the child seat 12.

In FIG. 23, when the processing is started upon turning on the ignition key, the acceleration signals from the acceleration sensor 21 are read (step S131), and the output from the passenger detection sensor 133 is read (step S132). In step S133, the currently read output from the passenger detection sensor 133 is compared with the previously read value to check if the output has changed. If NO in step S133, TSPPD1 and TRPPD1 are set (step S137), and the flow returns. On the other hand, if YES in step S133, it is checked if the horizontal acceleration is larger than the threshold value TA (step S134). If YES in step S134, TSPPD2 and TRPPD2 are set (step S136), and the flow then returns. If NO in step S134, it is checked if the vertical acceleration is larger than the threshold value TB (step S135). If YES in step S135, TSPPD2 and TRPPD2 are set (step S136), and the flow then returns. On the other hand, if NO in step S135, TSPPD1 and TRPPD1 are set (step S137), and the flow returns. Hence, when the changes in output from the passenger detection sensor 133 and detection of the acceleration signal larger than the horizontal or vertical threshold value have taken place at the same time, the time until the switching processing for the necessity of airbag deployment is done can be extended by setting larger setting values in the status determination timers.

Since the processing other than that shown in FIG. 23 is the same as in the first embodiment (in this embodiment, the acceleration signals from the acceleration sensor 21 are input to the control unit 11 in the block diagram of the airbag system in FIG. 1), and a detailed description thereof will be omitted. Note that the determination processing result of this embodiment that uses accelerations G may also be used in FIG. 19 in the second embodiment.

<Modification of Fourth Embodiment>

Figure 24:
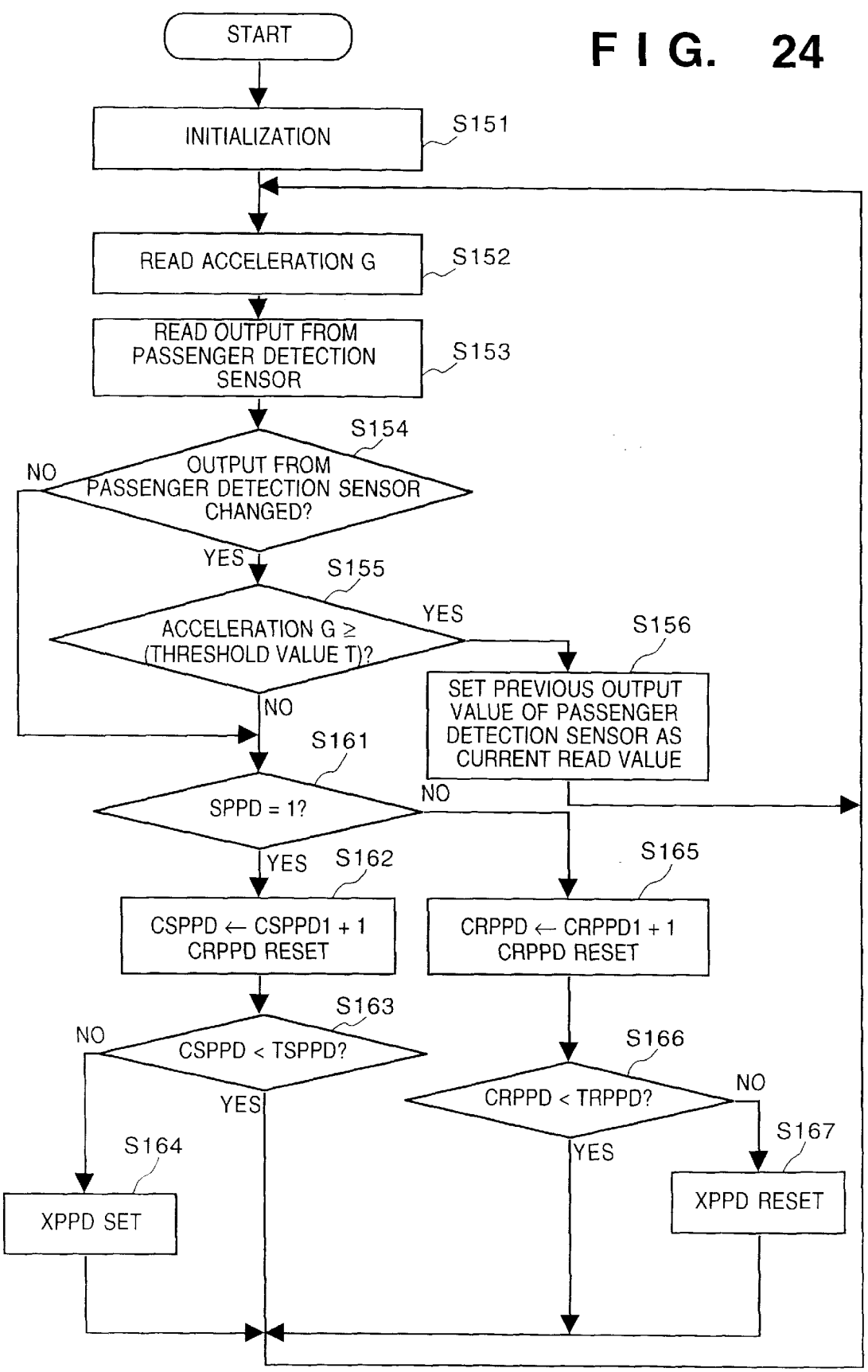
FIG. 24 is a flow chart showing status determination according to a modification of the fourth embodiment of the present invention (upon determining passenger detection).

In this modification as well, the switching control for the necessity of airbag deployment is similarly prevented from being improperly done in the situation described in the third embodiment described above. However, as that prevention means, the status determination time setting processing is done by the processing in FIG. 14 described in the first embodiment as without using the flow chart shown in FIG. 23 described in the fourth embodiment above, and the processing shown in FIG. 24 is done in place of status determination shown in FIG. 15. That is, in this modification, an acceleration signal obtained from the acceleration sensor 21 is used in determination of passenger detection, and detection of the presence/absence, direction, and position offset of the child seat 12. This is because when an abnormal state, i.e., a state wherein the changes in output from the passenger detection sensor 133 and detection of the acceleration signal from the acceleration sensor 21 larger than the threshold value have taken place at the same time has continued beyond the extended determination time (TSPPD2, TRPPD2), the control unit 11 may switch the necessity of airbag deployment (however, such situation is rare in practice). Hence, in this modification, the necessity of airbag deployment is inhibited from being switched as long as the above-mentioned abnormal state continues.

FIG. 24 is a flow chart showing status determination according to the modification of the fourth embodiment of the present invention (upon determining passenger detection). In practice, the same flow charts as in FIG. 24 are prepared in correspondence with detection of the presence/absence, direction, and position offset of the child seat 12.

In FIG. 24, when the processing is started upon turning on the ignition key, initialization is done (step S151), an acceleration signal from the acceleration sensor 21 is read (step S152), and the output from the passenger detection sensor 133 is read (step S153). In step S154, the currently read output from the passenger detection sensor 133 is compared with the previously read value to check if the output has changed. If NO in step S154, the flow advances to step S161. On the other hand, if YES in step S154, it is checked if an acceleration G is larger than the threshold value T (step S155). If NO in step S155, the flow advances to step S161. On the other hand, if YES in step S155, the current output value from the passenger detection sensor 133 acquired in step S153 is ignored, and the previous value is set as the currently read value (step S156). The flow then returns to step S152. The meaning of the processing in step S156 will be explained below. That is, by setting the output value of the passenger detection sensor 133 at the previous value, "the output has changed (YES)" is determined again in step S154 in the next loop. Hence, only when the current acceleration G is larger than the predetermined threshold value T (corresponding to the above-mentioned abnormal state), YES is determined in step S155, and the loop of steps S156 and S152 is repeated. In this case, the processing in step S161 and the subsequent steps is not done, i.e., the count processing in steps S161 to S137 is held. Therefore, as long as the abnormal state continues, switching of the necessity of airbag deployment is kept inhibited. Since the processing in step S161 and the subsequent steps is the same as that in step S21 and the subsequent steps in FIG. 15, a detailed description thereof will be omitted.

In this modification, the processing other than that in FIG. 24 above is the same as that in the first embodiment (in this modification, the acceleration signals from the acceleration sensor 21 are input to the control unit 11 in the block diagram of the airbag system in FIG. 1), and a detailed description thereof will be omitted.

As described above, according to the embodiments described above, an airbag system for a vehicle, which can properly control the necessity of airbag deployment in correspondence with the attached state of the child seat can be provided. With this system, the fail safe performance upon attaching the child seat can be improved.

As many apparently widely different embodiments of the present invention can be made without departing from the spirit and scope thereof, it is to be understood that the invention is not limited to the specific embodiments thereof except as defined in the appended claims.

What is claimed is:

1. An airbag system for a vehicle, which comprises determining means for making a predetermined communication between a seat of a vehicle and a child seat placed on the seat, and determining a direction of the child seat, and control means for, when an output from said determining means indicates the child seat facing the front direction of the vehicle, permitting an airbag, associated with the child seat placement, to deploy, and for, when the output from said determining means indicates the child seat facing the rear direction of the vehicle, inhibiting the airbag from deploying, wherein when said control means detects that the predetermined communication is made by said determining means, and said determining means cannot determine the direction of the child seat, said control means inhibits the airbag from deploying.

2. The system according to claim 1, wherein when said control means detects that the predetermined communication is made by said determining means, and said determining means cannot determine the direction of the child seat, said control means inhibits the airbag from deploying irrespective of a state of an external sensor output input to said control means.

3. The system according to claim 1, wherein said determining means receives an output from a sensor used for determining the direction of the child seat, and a case in which said determining means cannot determine the direction of the child seat includes a case in which the sensor is defective.

4. The system according to claim 3, wherein when said control means detects that the predetermined communication is made by said determining means, and said determining means cannot determine the direction of the child seat, said control means inhibits the airbag from deploying irrespective of a state of an external sensor output input to said control means.

5. The system according to claim 1, wherein a case in which said determining means cannot determine the direction of the child seat does not include a case in which the direction of the child seat agrees with the front or rear direction of the vehicle.

6. The system according to claim 1, wherein a case in which said determining means cannot determine the direction of the child seat includes a case in which an attached position of the child seat is offset from a predetermined position.

7. The system according to claim 1, further comprising warning means for, when said control means inhibits the airbag from deploying, generating a warning indicating the inhibition.

8. The system according to claim 7, wherein said when an attached position of the child seat is offset from a predetermined position, said warning means generates a warning indicating the position offset.

9. An airbag system for a vehicle, which comprises determining means for making a predetermined communication between a seat of a vehicle and a child seat placed on the seat, and determining a direction of the child seat, and control means for, when an output from said determining means indicates the child seat facing the front direction of the vehicle, permitting an airbag, associated with the child seat placement, to deploy, and for, when the output from said determining means indicates the child seat facing the rear direction of the vehicle, inhibiting the airbag from deploying, wherein when said control means detects that the predetermined communication is made by said determining means, and said determining means cannot determine the direction of the child seat, said control means inhibits the airbag from deploying irrespective of a state of an external sensor output input to said control means.

10. An airbag system for a vehicle, which comprises a determining device for making a predetermined communication between a communication unit of a seat of a vehicle and a communication unit of a child seat placed on the seat, and determining a direction of the child seat, and a CPU for, when an output from said determining device indicates the child seat facing the front direction of the vehicle, permitting an airbag, associated with the child seat placement, to deploy, and for, when the output from said determining device indicates the child seat facing the rear direction of the vehicle, inhibiting the airbag from deploying, wherein when said CPU detects that the predetermined communication is made by said determining device, and said determining device cannot determine the direction of the child seat, said CPU inhibits the airbag from deploying.

11. The system according to claim 10, wherein when said CPU detects that the predetermined communication is made by said determining device, and said determining device cannot determine the direction of the child seat, said CPU inhibits the airbag from deploying irrespective of a state of an external sensor output input to said CPU.

12. The system according to claim 10, wherein said determining device receives an output from a sensor used for determining the direction of the child seat, and a case in which said determining device cannot determine the direction of the child seat includes a case in which the sensor is defective.

13. The system according to claim 12, wherein when said CPU detects that the predetermined communication is made by said determining device, and said determining device cannot determine the direction of the child seat, said CPU inhibits the airbag from deploying irrespective of a state of an external sensor output input to said CPU.

14. The system according to claim 10, wherein a case in which said determining device cannot determine the direction of the child seat does not include a case in which the direction of the child seat agrees with the front or rear direction of the vehicle.

15. The system according to claim 10, wherein a case in which said determining device cannot determine the direction of the child seat includes a case in which an attached position of the child seat is offset from a predetermined position.

16. The system according to claim 10, further comprising warning device for, when said CPU inhibits the airbag from deploying, generating a warning indicating the inhibition.

17. The system according to claim 16, wherein said when an attached position of the child seat is offset from a predetermined position, said warning device generates a warning indicating the position offset.

* * * * *